US010288853B2

(12) United States Patent
Hirose

(10) Patent No.: US 10,288,853 B2
(45) Date of Patent: May 14, 2019

(54) ZOOM LENS AND IMAGE PICKUP DEVICE

(71) Applicant: KONICA MINOLTA, INC., Chiyoda-ku, Tokyo (JP)

(72) Inventor: Takuma Hirose, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/823,019

(22) Filed: Nov. 27, 2017

(65) Prior Publication Data
US 2018/0172953 A1 Jun. 21, 2018

(30) Foreign Application Priority Data

Dec. 17, 2016 (JP) ................... 2016-244944

(51) Int. Cl.
| G02B 7/10 | (2006.01) |
| G02B 13/00 | (2006.01) |
| G02B 15/177 | (2006.01) |
| G02B 15/20 | (2006.01) |
| G02B 15/173 | (2006.01) |
| G02B 13/18 | (2006.01) |
| G02B 15/163 | (2006.01) |

(52) U.S. Cl.
CPC ............. *G02B 13/009* (2013.01); *G02B 7/10* (2013.01); *G02B 15/173* (2013.01); *G02B 15/177* (2013.01); *G02B 15/20* (2013.01); *G02B 13/18* (2013.01); *G02B 15/163* (2013.01)

(58) Field of Classification Search
CPC ...... G02B 13/009; G02B 7/10; G02B 15/173; G02B 15/177; G02B 15/20

USPC ......................................... 359/692
See application file for complete search history.

(56) References Cited

U.S. PATENT DOCUMENTS

| 4,896,950 A * | 1/1990 | Endo .................... G02B 15/173 359/683 |
| 5,847,882 A * | 12/1998 | Nakayama ........... G02B 15/173 359/684 |
| 6,061,186 A * | 5/2000 | Nishio ................. G02B 15/173 359/683 |
| 8,964,302 B2 | 2/2015 | Kawamura et al. |
| 2006/0056055 A1* | 3/2006 | Obama ................ G02B 15/173 359/689 |

(Continued)

FOREIGN PATENT DOCUMENTS

| JP | 2005055625 A | 3/2005 |
| JP | 2013231827 A | 11/2013 |
| JP | 2013257497 A | 12/2013 |

Primary Examiner — James R Greece
(74) Attorney, Agent, or Firm — Holtz, Holtz & Volek PC

(57) ABSTRACT

There are provided a zoom lens which has a wide angle, maintains the brightness of an F-number, and has various aberrations excellently corrected, and an image pickup device having such zoom lens mounted thereon. A zoom lens 10 substantially includes a positive first lens group Gr1, a negative second lens group Gr2, a positive third lens group Gr3, a positive fourth lens group Gr4, and a fifth lens group Gr5 in order from an object side. At a time of magnification change from a wide-angle end to a telephoto end, the first lens group Gr1 and fifth lens group Gr5 are fixed, while the second lens group Gr2, the third lens group Gr3, and the fourth lens group Gr4 move, and the conditional expressions (1) and (2) are satisfied.

17 Claims, 10 Drawing Sheets

(56) References Cited

U.S. PATENT DOCUMENTS

| | | | |
|---|---|---|---|
| 2006/0291070 A1* | 12/2006 | Terada | G02B 15/173 359/687 |
| 2010/0321791 A1* | 12/2010 | Hayakawa | G02B 15/173 359/684 |
| 2011/0019033 A1* | 1/2011 | Ori | G02B 15/173 348/240.3 |
| 2012/0314298 A1* | 12/2012 | Ota | G02B 15/173 359/683 |
| 2013/0229565 A1* | 9/2013 | Hatakeyama | G02B 15/173 348/345 |
| 2015/0316753 A9 | 11/2015 | Hosoi | |
| 2017/0108678 A1* | 4/2017 | Miyazawa | G02B 15/17 |

* cited by examiner

FIG.1
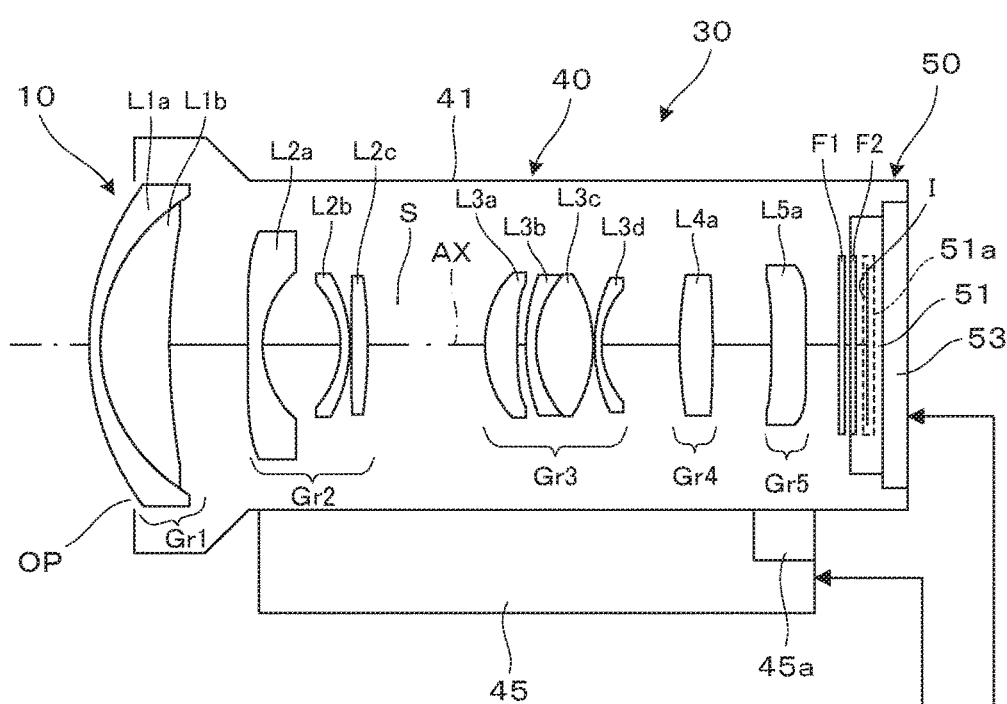
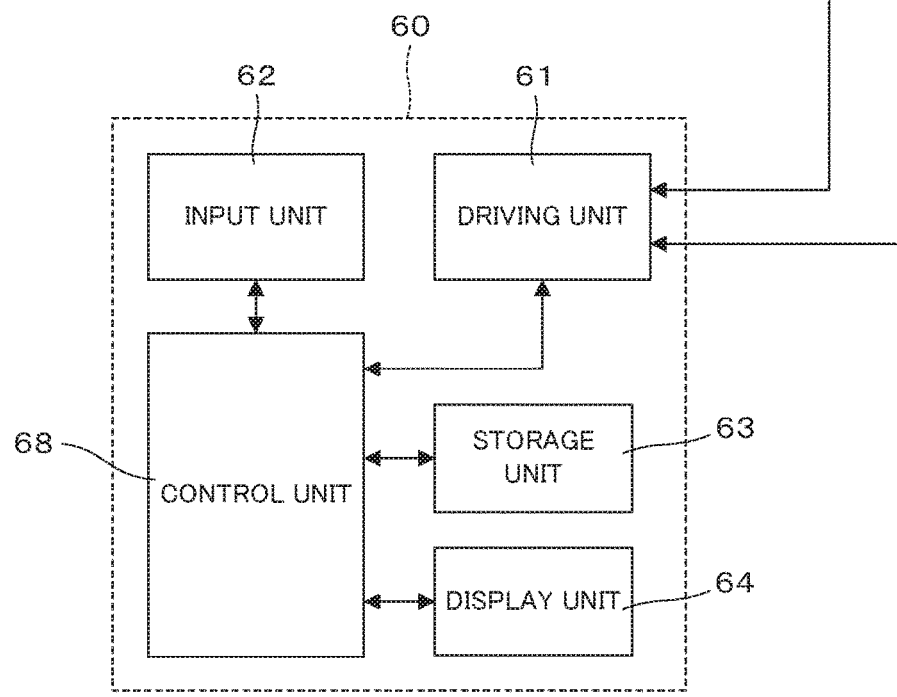

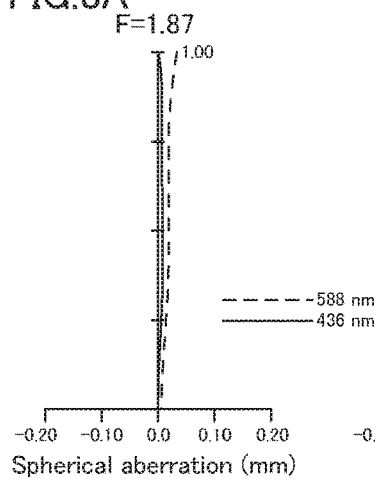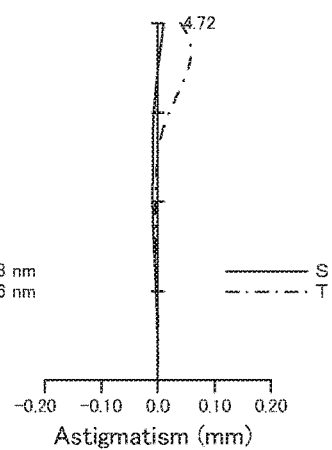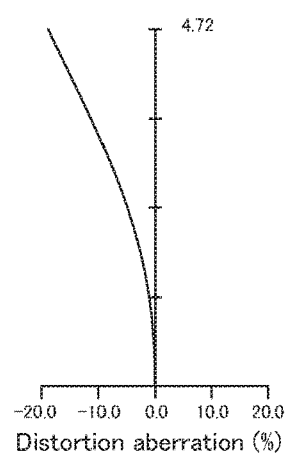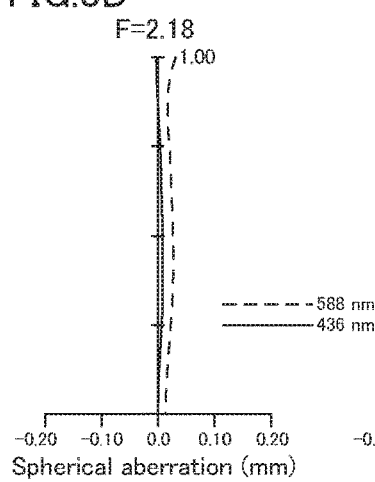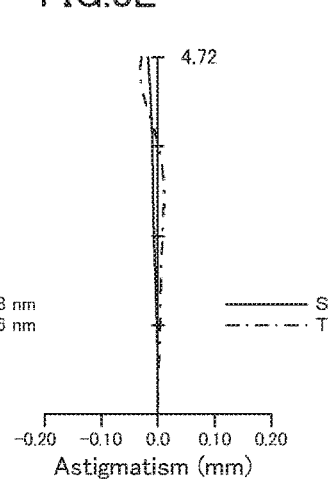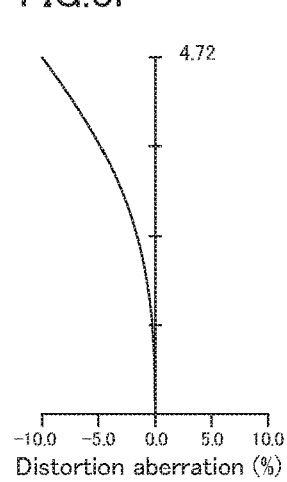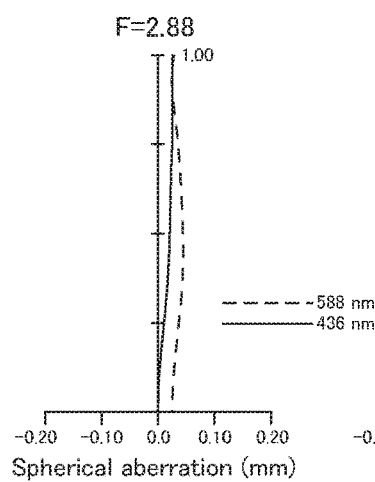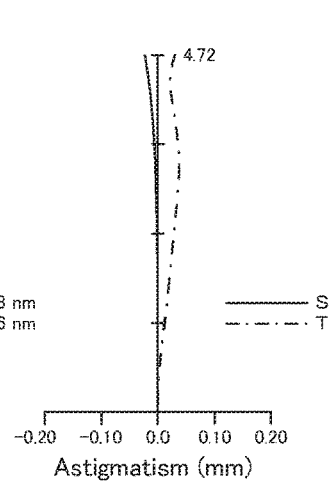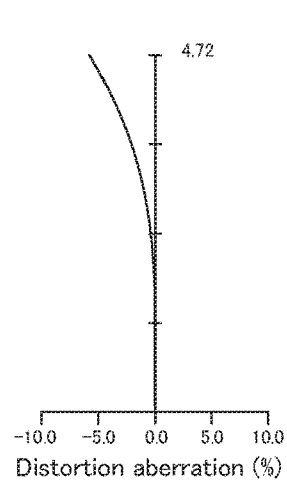

ZOOM LENS AND IMAGE PICKUP DEVICE

The entire disclosure of Japanese patent Application No. 2016-244944, filed on Dec. 17, 2016, is incorporated herein by reference in its entirety.

TECHNOLOGICAL FIELD

The present invention relates to a zoom lens and an image pickup device, and, for example, relates to a zoom lens used for an optical unit or the like for capturing an image and/or video of a subject with an image pickup element, the zoom lens being excellent in achieving a reduction in size, a reduction in thickness, and an increase in angle of view, and to an image pickup device provided with this zoom lens.

BACKGROUND

In recent years, in a digital still camera and/or video camera using a solid-state image pickup element which is a CCD (Charge Coupled Device) type or CMOS (Complementary Metal Oxide Semiconductor) type image sensor, there has been an increasing need for a zoom lens which achieves both compactness, such as a reduction in size and a reduction in thickness, and high performances (large diameter) such as brightness and/or wide angle of view.

On the other hand, as a zoom lens system, there has been conventionally a need for the one with a high optical performance covering from a wide-angle end to a telephoto end, and for example several optical systems answering to the zoom lens of a relatively wide angle are disclosed in Patent Gazette (e.g., see Patent Literatures 1, 2, and 3).

However, in Patent Literature 1, although the focal length is set so as to cover a relatively wide angle with a four-group lens configuration, the F-number is relatively dark, while in Patent Literatures 2 and 3, although the focal length is set so as to cover a relatively wide angle with a five-group lens configuration, the F-number is also dark, and so on, and it is therefore difficult to simultaneously satisfy both an increase in angle of view at a focal length and an increase in brightness.

CITATION LIST

Patent Literature

[Patent Literature 1] Japanese Patent Laid-Open No. 2013-257497
[Patent Literature 2] Japanese Patent Laid-Open No. 2013-231827
[Patent Literature 3] Japanese Patent Laid-Open No. 2005-55625

SUMMARY

The present invention has been made in view of the above-described problems and has an object to provide a zoom lens which has a wide angle, maintains the brightness of an F-number, and has various aberrations excellently corrected, and an image pickup device having such a zoom lens mounted thereon.

In order to achieve at least one of the above-described purposes, a zoom lens according to an aspect of the present invention includes: a first lens group having a positive refractive power; a second lens group having a negative refractive power; a third lens group having a positive refractive power; a fourth lens group having a positive refractive power; and a fifth lens group arranged in order from an object side, wherein at the time of magnification change from a wide-angle end to a telephoto end, the first lens group and fifth lens group are fixed, while the second lens group, third lens group, and fourth lens group move, and the following conditional equations are satisfied:

$$6.0 < f1/fw < 11.0 \tag{1}$$

$$1.80 < f3/fw < 3.10 \tag{2}$$

where
f1: focal length (mm) of the first lens group,
f3: focal length (mm) of the third lens group, and
fw: focal length (mm) of an entire system at a wide-angle end.

In order to achieve at least one of the above-described purposes, an image pickup device according to an aspect of the present invention has the above-described zoom lens mounted thereon.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 illustrates an image pickup device provided with a zoom lens of an embodiment of the present invention.

FIGS. 8A to 8C are the longitudinal aberration diagrams at a wide-angle end of the zoom lens of Example 3, FIGS. 8D to 8F are the longitudinal aberration diagrams in the middle of the zoom lens of Example 3, and FIGS. 8G to 8I are the longitudinal aberration diagrams at a telephoto end of the zoom lens of Example 3.

DETAILED DESCRIPTION OF EMBODIMENTS

Figure 2:
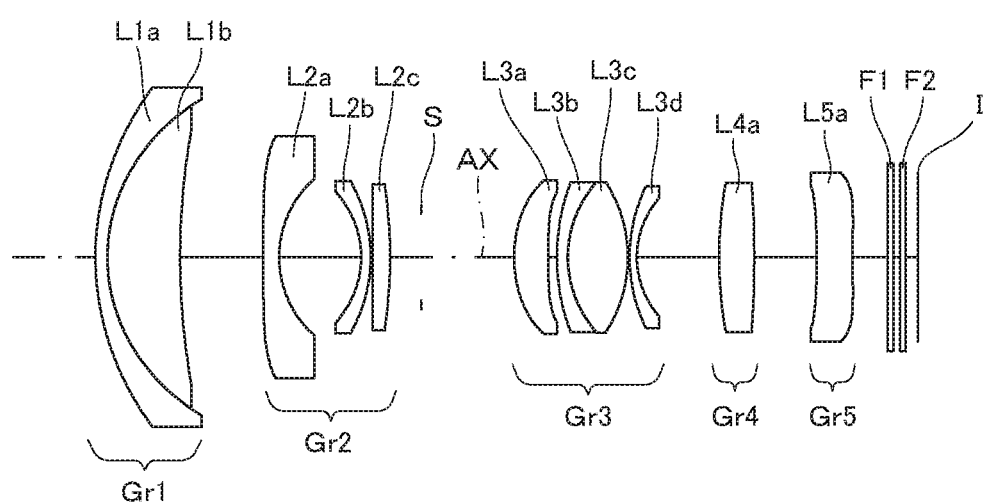
FIG. 2 is a cross-sectional view of a zoom lens and the like of Example 1.

Hereinafter, one of or more embodiments of the invention will be described with reference to the drawings. However, the scope of the invention is not limited to the disclosed embodiments.

FIG. 1 is a cross-sectional view illustrating an image pickup device 100 according to an embodiment of the present invention. The image pickup device 100 includes a camera module 30 for forming an image signal and a processing unit 60 configured to exhibit the function as the image pickup device 100 by operating the camera module 30.

The camera module 30 includes a lens unit 40 incorporating a zoom lens 10, and a sensor unit 50 configured to convert a subject image formed by the zoom lens 10 into an image signal. The camera module 30 incorporates the zoom lens 10 described in detail hereinafter, so the image pickup device 100 which is thinner and has an excellent imaging quality can be provided.

The lens unit 40 includes the zoom lens 10, a lens holder 41 incorporating the zoom lens 10, and an optical system driving unit 45. The zoom lens 10 is constituted by first to fifth lens groups Gr1 to Gr5 arranged in order from an object side as described in detail later. The lens holder 41 is formed from a resin etc., and houses and holds a lens and the like thereinside. The lens holder 41 includes an opening OP for allowing a pencil of light from an object side to enter the lens holder 41. The optical system driving unit 45 is provided associating with the lens holder 41 which is a lens barrel. The optical system driving unit 45 includes a mechanical mechanism for allowing the second to fourth lens groups Gr2 to Gr4 to smoothly move in an optical-axis AX direction, and enables magnification change and focusing. Here, the magnification change and focusing can be manually performed by a user operating a mechanical mechanism, but can also be electrically performed via a motor or the like. Note that, the optical system driving unit 45 may include a shift mechanism 45a for shifting, in a direction perpendicular to the optical axis AX, a lens constituting the fifth lens group Gr5. In this case, camera shake correction or image blur suppression is enabled by shifting a lens constituting the fifth lens group Gr5.

The sensor unit 50 includes: a solid-state image pickup element 51 (e.g., CMOS type image sensor) which photoelectrically converts a subject image formed by the zoom lens 10; and a substrate 53 which supports this solid-state image pickup element 51 from behind and has a wiring, a peripheral circuit, etc. provided thereon. The sensor unit 50 is held inside the lens holder 41.

The solid-state image pickup element (image pickup element) 51 includes a photoelectric conversion unit 51a with an image pickup surface I, around which a non-illustrated signal processing circuit is formed. Note that, the solid-state image pickup element 51 is not limited to the above-described CMOS type image sensor, but may be the one to which a CCD or the like is applied.

The processing unit 60 includes a driving unit 61, an input unit 62, a storage unit 63, a display unit 64, and a control unit 68. The driving unit 61 outputs YUV signals and other digital pixel signals to an external circuit, and/or receives, from the control unit 68, supply of the voltage and/or clock signals for driving the solid-state image pickup element 51 so as to operate the solid-state image pickup element 51. Moreover, the driving unit 61 is capable of performing camera shake correction by operating the shift mechanism 45a by outputting a control signal to the optical system driving unit 45 on the basis of an output from a non-illustrated gyro sensor or the like and by displacing a lens constituting the fifth lens group Gr5 in a direction perpendicular to the optical axis AX. Note that the driving unit 61 is also capable of performing the magnification change and focusing of the zoom lens 10 by operating the optical system driving unit 45. The input unit 62 is for receiving an operation of a user or a command from an external device, the storage unit 63 is for storing the information required for operation of the image pickup device 100 and the image data and the like obtained by the camera module 30, and the display unit 64 is for displaying the information to be presented to a user, a captured image, and the like. The control unit 68 integrally controls the operations of the driving unit 61, input unit 62, storage unit 63, etc., and is capable of performing various types of image processing on the image data obtained by the camera module 30, for example.

Hereinafter, the detail of the zoom lens 10 according an embodiment will be explained with reference to FIG. 1. Note that the zoom lens 10 illustrated in FIG. 1 has the same configuration as a zoom lens 11 of Example 1 to be described later.

The illustrated zoom lens 10 is an image pickup lens to form a subject imaged onto the image pickup surface I of the solid-state image pickup element 51, and includes: the first lens group Gr1 having a positive refractive power; the second lens group Gr2 having a negative refractive power; the third lens group Gr3 having a positive refractive power; an aperture stop S; the fourth lens group Gr4 having a positive refractive power; and the fifth lens group Gr5 arranged in order from an object side. For the fifth lens group Gr5, the refractive power can be set to be positive, negative, or zero.

At the time of magnification change from a wide-angle end to a telephoto end or zooming of the zooming lens 10, the first lens group Gr1 and fifth lens group Gr5 are fixed, while the second lens group Gr2, third lens group Gr3, and fourth lens group Gr4 individually move in the optical-axis AX direction. Moreover, at the time of focusing the above-described zoom lens 10, the fourth lens group Gr4 individually moves in the optical-axis AX direction.

Since the magnification change function can be shared among three lens groups by moving the second lens group Gr2, third lens group Gr3, and fourth lens group Gr4 at the time of the magnification change from a wide-angle end to a telephoto end, it is possible to suppress the group power and/or magnification change movement amount and achieve both compactness and excellent optical performances as compared with the cases where the magnification change is performed with only a single lens group or two lens groups. On the other hand, the first and fifth lens groups Gr1, Gr5 are fixed at the time of magnification change or focusing. By fixing the first lens group Gr1, a lens will not protrude at the time of photographing, so a person to be photographed will not receive a feeling of oppression. Moreover, an influence from an impact is also smaller and more preferable if a lens does not protrude. Furthermore, by fixing the fifth lens group Gr5, the penetration of dust into the solid-state image pickup element 51 which is an image pickup element can be prevented.

In the above-described zoom lens 10, the first lens group Gr1 is constituted by a first a-lens or 1a-th lens L1a having a negative refractive power and a first b-lens or 1b-th lens L1b having a positive refractive power in order from an object side. By constituting the first lens group Gr1 in this manner, a reduction of the entire lens length can be achieved while excellently correcting the chromatic aberration and/or spherical aberration at a telephoto end. Moreover, the first a-lens L1a and first b-lens L1b are cemented lenses. By setting the first a-lens L1a and first b-lens L1b to cemented lenses, assembly can be relatively easily performed as compared with the case where each is a single lens.

The second lens group Gr2 includes a second a-lens or 2a-th lens L2a having a negative refractive power, a second b-lens or 2b-th lens L2b having a negative refractive power, and a second c-lens or 2c-th lens L2c having a positive refractive power in order from an object side. By arranging two negative lenses, i.e., the second a-lens L2a having a negative refractive power and the second b-lens L2b having a negative refractive power, on the object side, the inclination angle relative to the optical axis AX of a light ray which enters at a large angle from the first lens group Gr1 having a large diameter can be instantaneously alleviated and field curvature and distortion can be effectively corrected. Furthermore, by arranging the second c-lens L2c having a positive refractive power on an image side, chromatic aberration of magnification at a wide-angle end and axial chromatic aberration at a telephoto end can be effectively corrected. The second lens group Gr2 includes at least one aspheric surface. By providing the second lens group Gr2 with at least one aspheric surface in this manner, various aberrations can be corrected. The aspheric surface of the second lens group Gr2 corrects the off-axis aberration mainly caused by the refraction of an off-axis principal ray.

The third lens group Gr3 is composed of a third a-lens or 3a-th lens L3a having a positive refractive power, a third b-lens or 3b-th lens L3b having a negative refractive power, a third c-lens or 3c-th lens L3c having a positive refractive power, and a third d-lens or 3d-th lens L3d having a negative refractive power in order from the object side. By constituting the third lens group Gr3 in this manner, spherical aberration and chromatic aberration can be appropriately corrected. In a five-group configuration such as this zoom lens 10, a surface having a strong power is required so as to focus a light beam entering the third lens group Gr3, but if a surface is provided with a strong power, particularly spherical aberration easily occurs, which is not preferable. Moreover, in order to suppress aberration, it is usually advantageous to suppress a fluctuation of a light-ray height. The third lens group Gr3 has a lens configuration including a positive lens, a negative lens, a positive lens, and a negative lens, so that a fluctuation of the light-ray height can be suppressed, and chromatic aberration correction by a combination of a positive lens and a negative lens can be efficiently performed. Moreover, in the third lens group Gr3, the third b-lens L3b and third c-lens L3c are cemented lenses. In this case, assembly can be relatively easily performed as compared with a case where each is a single lens. Furthermore, the third a-lens L3a has a convex surface facing an object side, and the third lens group Gr3 includes at least one aspheric surface. Since the third a-lens L3a has a convex surface facing an object side, spherical aberration can be excellently corrected. Moreover, by providing at least one aspheric surface, spherical aberration and/or coma aberration can be excellently corrected.

The aperture stop S is arranged on an object side of the third lens group Gr3, and is fixed at an image surface position at the time of magnification change from a wide-angle end to a telephoto end. By providing the aperture stop S in a vicinity of the third lens group Gr3 located at a substantially center of the zoom lens 10, the off-axis aberration can be corrected in well balance. Moreover, in the case where the third lens group Gr3 moves at the time of magnification change from a wide-angle end to a telephoto end or zooming in photographing or imaging, securing of the peripheral light amount at a wide-angle end becomes difficult and therefore the aperture stop S is preferably fixed with respect to an image surface.

The fourth lens group Gr4 is constituted by a single lens L4a having a positive refractive power. Since the thickness of the fourth lens group Gr4 can be thinned by constituting the fourth lens group Gr4 with one single lens L4a, the entire lens length can be shortened. The focusing from an infinite object to a short-distance object is performed by moving the fourth lens group Gr4 in the optical-axis AX direction. By performing focusing with the fourth lens group Gr4 in this manner, a clear image can be obtained even from a short-distance object without causing an increase of the entire optical length and/or an increase of the front-lens diameter due to feeding-out of the fourth lens group Gr4.

The fifth lens group Gr5 is constituted by, for example, a single lens L5a having at least one aspheric surface. When the fifth lens group Gr5 is constituted by the single lens L5a, it becomes possible to achieve a reduction in cost and a reduction in size of an optical system. Moreover, in the fifth lens group Gr5, since a light ray incident at each image height position of the image pickup surface I passes through a different position inside the lens, particularly the field curvature of the peripheral image height can be excellently corrected by the fifth lens group Gr5 having an aspheric surface.

Note that the fifth lens group Gr5 can include a fifth a-lens or 5a-th lens L5a having a positive refractive power and a fifth b-lens or 5b-th lens L5b having a negative refractive power in order from an object side (see FIG. 9A etc. described later). When the fifth lens group Gr5 is constituted by the fifth a-lens L5a having a positive refractive power and the fifth b-lens L5b having a negative refractive power in order from an object side, field curvature and chromatic aberration can be effectively corrected. Moreover, an image blur can be corrected by shifting the fifth a-lens L5a having a positive refractive power of the fifth lens group Gr5 in a direction perpendicular to the optical axis AX. Since interference between the shift mechanism 45a for camera shake correction and the other driving mechanisms can be eliminated by shifting the fifth a-lens L5a of the fifth lens group Gr5 fixed at the time of magnification change or focusing, a further reduction in size of the zoom lens 10 can be achieved. Furthermore, since the fifth a-lens L5a is a positive lens, the chromatic aberration of magnification can be suppressed, so high optical performances can be secured.

A lens which does not substantially have a refractive power can be added, between the first to fifth lens groups Gr1 to Gr5 described above or on an image side or on an object side.

Moreover, the zoom lens 10 satisfies the conditional expressions (1) and (2) below:

$$6.0 < f1/fw < 11.0 \tag{1}$$

$$1.80 < f3/fw < 3.10 \tag{2}$$

where the value f1 is the focal length (mm) of the first lens group Gr1, the value f3 is the focal length (mm) of the third lens group Gr3, and the value fw is the focal length (mm) of an entire system at a wide-angle end.

The above-described conditional expression (1) specifies a relationship between the focal length of the first lens group Gr1 and the focal length of the entire lens system at a wide-angle end. By the value f1/fw exceeding the lower limit of the conditional expression (1), it is possible to prevent the refractive power of the first lens group Gr1 from becoming stronger than the refractive power of the entire lens system at a wide-angle end, and is possible to avoid the aberration at a wide-angle end becoming too large, which are advantageous to secure favorable optical performances. On the other hand, by the value f1/fw falling under the upper limit of the conditional expression (1), it is possible to prevent the refractive power of the first lens group Gr1 from becoming weaker than the refractive power of the entire lens system at a wide-angle end, and is possible to avoid the total lens thickness of the first lens group Gr1 becoming too large, which is advantageous in that the compactness can be more easily secured. The conditional expression (2) specifies the refractive power of the third lens group Gr3. By the value f3/fw exceeding the lower limit of the conditional expression (2), it is possible to prevent the refractive power of the third lens group Gr3 from becoming relatively strong, so that correction of the spherical aberration and coma aberration at a telephoto end is relatively easy. On the other hand, by the value f3/fw falling under the upper limit of the conditional expression (2), it is possible to prevent the refractive power of the third lens group Gr3 from becoming relatively weak, and is possible to avoid the refractive power of the second lens group Gr2 becoming too strong in order to secure a magnification-change ratio, so that correction of the spherical aberration at a telephoto end is relatively easy.

The zoom lens 10 satisfies the conditional expressions (3) below:

$$-2.00 < f2/fw < -1.30 \quad (3)$$

where the value f2 is the focal length (mm) of the second lens group Gr2, and the value fw is the focal length (mm) of an entire system at a wide-angle end.

The above-described conditional expression (3) specifies the refractive power of the second lens group Gr2. By the value f2/fw falling under the upper limit of the conditional expression (3), it is possible to prevent the Petzval sum from resulting in excessive correction in the negative direction. On the other hand, by the value f2/fw exceeding the lower limit of the conditional expression (3), an increase of the movement amount of the second lens group Gr2 contributing to the magnification change is prevented to facilitate a reduction in size of the lens unit 40.

The zoom lens 10 satisfies the conditional expressions (4) below:

$$0.10 < |\beta 2T/\beta 2W|/|\beta 3T/\beta 3W| < 0.80 \quad (4)$$

where the value $\beta 2W$ is the lateral magnification at a wide-angle end of the second lens group Gr2, the value $\beta 2T$ is the lateral magnification at a telephoto end of the second lens group Gr2, the value $\beta 3W$ is the lateral magnification at a wide-angle end of the third lens group Gr3, and the value $\beta 3T$ is the lateral magnification at a telephoto end of the third lens group Gr3.

The above-described conditional expression (4) specifies the magnification change burdens of the second lens group Gr2 and third lens group Gr3. By the value $|\beta 2T/\beta 2W|/|\beta 3T/\beta 3W|$ falling under the upper limit of the conditional expression (4), it is possible to prevent an increase of the magnification change burden of the second lens group Gr2, and is possible to prevent a difference in the incident angle when the entire light beam around a screen enters the lens surface from becoming too large at a wide-angle end and at a telephoto end in the second lens group Gr2. As a result, an increase of the change of the field curvature due to the magnification change can be suppressed to excellently correct the field curvature across the entire region of the magnification change. On the other hand, by the value $|\beta 2T/\beta 2W|/|\beta 3T/\beta 3W|$ exceeding the lower limit of the conditional expression (4), it is possible to prevent an increase of the magnification change burden of the third lens group Gr3, so that there is no need to set the refractive power of the third lens group Gr3 to be large. That is, there is no need to reduce the curvature radius of each lens surface within the third lens group Gr3, so that spherical aberration, coma aberration, etc. can be excellently corrected across the entire region of the magnification change.

The zoom lens 10 satisfies the conditional expressions (5) below:

$$3.00 < f4/fw < 8.00 \quad (5)$$

where the value f4 is the focal length (mm) of the fourth lens group Gr4, and the value fw is the focal length (mm) of an entire system at a wide-angle end.

The above-described conditional expression (5) specifies a relationship between the refractive power of the fourth lens group Gr4 and the focal length at a wide-angle end in the entire lens system. By the value f4/fw falling under the upper limit of the conditional expression (5), it is possible to avoid the optical system increasing in size in order to secure a movement amount which is required for the magnification change because the refractive power of the fourth lens group Gr4 becomes weak. On the other hand, by the value f4/fw exceeding the lower limit of the conditional expression (5), it is possible to avoid the refractive power of the fourth lens group Gr4 becoming too strong, and it is possible to avoid an excessive increase of the aberration occurring here or an excessive increase of a change of the optical performance due to a manufacturing error in this group.

When the fifth lens group Gr5 is constituted by the positive fifth a-lens L5a and the negative fifth b-lens L5b, the zoom lens 10 satisfies the conditional expressions (6) below:

$$0.1 < (1-\beta s) \times \beta p < 0.5 \quad (6)$$

where the value $\beta s$ is the lateral magnification of the fifth a-lens L5a at a telephoto end of the fifth lens group Gr5, and the value $\beta p$ is the lateral magnification of the fifth b-lens L5b at a telephoto end of the fifth lens group Gr5.

The conditional expression (6) specifies a percentage indicative of how much an image is to shift with respect to a unit movement amount of the fifth a-lens L5a having a positive refractive power of the fifth lens group Gr5 which shifts during camera shake correction. By the value $(1-\beta s) \times \beta p$ falling under the upper limit of the conditional expression (6), it is possible to avoid an excessive decrease of a lens shift amount required to shift an image by a certain specified amount, so that it is possible to prevent an excessive increase in accuracy required to control the shift mechanism 45a which is a driving unit, and is possible to prevent the image pickup device 100 from becoming expensive. On the other hand, by the value $(1-\beta s) \times \beta p$ exceeding the lower limit of the conditional expression (6), it is possible to avoid an excessive increase of a lens shift amount required to shift an image by a certain specified amount, so that it is possible to avoid an increase of the peripheral space of the fifth lens group Gr5, the increase being caused by the fact that the shift direction is a direction perpendicular to the optical axis AX.

Note that, filters F1 and F2 which are parallel flat plates can be arranged between the lens unit 40 and the sensor unit 50. The filters F1 and F2 are each a wavelength selection filter, a seal glass, etc.

EXAMPLES

Hereinafter, Examples of the zoom lens of the present invention will be shown. Reference numerals used in each Example are as follows. Note that the unit related to length is mm in principle, and the unit of angle is ° (degree).
R: curvature radius
D: axial surface distance
nd: refractive index of lens material relative to d-line
vd: Abbe number of lens material
ER: effective radius In each of the Examples, a surface with "*" put after each surface number is a surface having an aspherical shape, and the aspherical shape is expressed by "Formula 1" below, with the vertex of a surface as an origin, the X-axis in the optical axis direction, and a height in a direction perpendicular to the optical axis as h.

$$X = \frac{h^2/R}{1 + \sqrt{1 - (1+K)h^2/R^2}} + \sum A_i h^i \qquad \text{[Formula 1]}$$

where
Ai: the i-th order aspheric surface coefficient
R: curvature radius
K: conic constant.

Example 1

The data of a lens surface constituting a zoom lens of Example 1 is shown in Table 1 below. Note that, in Table 1 and so on below, the surface number is denoted by "S-N", the aperture stop is denoted by "S", and infinite is denoted by "infinity." Moreover, a variable axial surface distance is denoted by "dn" (n is a natural number). "*" attached to the surface number represents an aspheric surface.

TABLE 1

| S-N | R (mm) | D (mm) | Nd | v d | ER (mm) |
|---|---|---|---|---|---|
| 1 | 29.008 | 1.000 | 1.80518 | 25.5 | 14.81 |
| 2 | 17.960 | 0.010 | 1.51410 | 42.6 | 13.00 |
| 3 | 17.960 | 6.107 | 1.72342 | 38.0 | 12.97 |
| 4 | 76.662 | d1 | | | 11.88 |
| 5* | 1327.539 | 1.312 | 1.80139 | 45.5 | 10.40 |
| 6* | 10.646 | 6.905 | | | 7.36 |
| 7 | −9.917 | 0.800 | 1.77250 | 49.6 | 6.20 |
| 8 | −15.895 | 0.150 | | | 6.37 |
| 9 | 654.404 | 1.471 | 1.94595 | 18.0 | 6.14 |
| 10 | −53.268 | d2 | | | 6.08 |
| 11 S | infinity | d3 | | | 4.07 |
| 12* | 13.800 | 2.850 | 1.82080 | 42.7 | 6.46 |
| 13* | 80.769 | 0.754 | | | 6.18 |
| 14* | 23.045 | 0.900 | 1.82115 | 24.1 | 6.27 |
| 15 | 11.597 | 0.010 | 1.51410 | 42.6 | 6.18 |
| 16 | 11.597 | 5.048 | 1.49700 | 81.6 | 6.18 |
| 17 | −14.416 | 0.150 | | | 6.31 |
| 18 | 17.089 | 0.600 | 1.69895 | 30.1 | 5.94 |
| 19 | 9.273 | d4 | | | 5.61 |
| 20 | 45.834 | 2.945 | 1.49700 | 81.6 | 6.10 |
| 21 | −114.779 | d5 | | | 6.26 |
| 22* | −79.334 | 3.040 | 1.53048 | 55.7 | 6.65 |

TABLE 1-continued

| S-N | R (mm) | D (mm) | Nd | v d | ER (mm) |
|---|---|---|---|---|---|
| 23* | infinity | 2.940 | | | 7.14 |
| 24 | infinity | 0.500 | 1.51680 | 64.2 | 7.31 |
| 25 | infinity | 0.500 | | | 7.33 |
| 26 | infinity | 0.500 | 1.51680 | 64.2 | 7.35 |
| 27 | infinity | 1.000 | | | 7.37 |

The aspheric surface coefficients of the lens surfaces of Example 1 are shown in Table 2 below. Note that, in the following (including the lens data in Tables), a power multiplier of 10 ($2.5 \times 10^{-02}$, for example) is expressed by using E (2.5E-02, for example).

TABLE 2

| Fifth Surface |
|---|
| K = 0.00000E+00, A4 = −0.12446E−04, A6 = 0.13671E−05, A8 = −0.11269E−07, A10 = 0.37237E−10, A12 = 0.46734E−14 |
| Sixth Surface |
| K = −0.22368E+01, A4 = 0.14014E−03, A6 = 0.87243E−06, A8 = 0.23388E−07, A10 = −0.13967E−10, A12 = −0.84269E−12 |
| Twelfth Surface |
| K = 0.19597E+00, A4 = 0.32377E−04, A6 = 0.16868E−05, A8 = 0.24332E−07, A10 = −0.48235E−09, A12 = 0.40295E−11 |
| Thirteenth Surface |
| K = 0.40060E+02, A4 = 0.16688E−03, A6 = 0.46919E−05, A8 = 0.25739E−08, A10 = 0.10557E−09, A12 = −0.58813E−11 |
| Fourteenth Surface |
| K = −0.18950E+01, A4 = −0.15401E−04, A6 = 0.27551E−05, A8 = −0.49448E−07, A10 = 0.80347E−09, A12 = −0.10522E−10 |
| Twenty-second Surface |
| K = 0.00000E+00, A4 = 0.43715E−04, A6 = −0.27242E−05, A8 = −0.22939E−07, A10 = 0.10303E−08, A12 = −0.17298E−10 |
| Twenty-third Surface |
| K = 0.00000E+00, A4 = 0.12676E−03, A6 = −0.83953E−05, A8 = 0.75832E−07, A10 = −0.67301E−09, A12 = 0.12033E−11 |

Among the positions: (wide-angle end (Wide); middle (Middle); and telephoto end (Tele)), of the zoom lens of Example 1, the focal length (f) of the entire system, F number (Fno), half-angle of view (W), maximum image height (Y), and interval (dn and n=1 to 5) at each position are shown in Table 3 below.

TABLE 3

| | Wide | Middle | Tele |
|---|---|---|---|
| f | 9.00 | 15.17 | 25.69 |
| Fno | 2.06 | 2.55 | 2.87 |
| W | 41.4 | 27.6 | 17.2 |
| 2Y | 12.876 | 14.257 | 14.829 |
| d1 | 1.143 | 7.007 | 8.332 |
| d2 | 8.501 | 2.637 | 1.312 |
| d3 | 11.916 | 7.803 | 0.500 |
| d4 | 4.791 | 6.926 | 6.932 |
| d5 | 3.28 | 5.255 | 12.551 |

The data of single-lens groups of Example 1 is shown in Table 4 below.

TABLE 4

| Lens Group | First Surface | Focal Length (mm) |
|---|---|---|
| 1 | 1 | 67.74 |
| 2 | 5 | −12.17 |
| 3 | 12 | 16.32 |
| 4 | 20 | 66.31 |
| 5 | 22 | −149.55 |

FIG. 2 and FIGS. 3A to 3C are the cross-sectional views of the zoom lens 11 of Example 1. FIG. 2 illustrates a cross-sectional view in the middle of the zoom lens 11. Note that all the cross-sectional views hereinafter are the cross-sectional views when a subject distance is infinite. The zoom lens 11 of Example 1 is composed of the first to fifth lens groups Gr1 to Gr5 in order from an object side, and has the configuration of positive, negative, positive, positive, and negative lenses. Here, the first lens group Gr1 includes a negative-meniscus first a-lens L1a convex to the object side and a positive-meniscus first b-lens L1b convex to the object side. The second lens group Gr2 includes a negative-meniscus second a-lens L2a convex to the object side, a negative-meniscus second b-lens L2b convex to the image side, and a biconvex and positive second c-lens L2c. The third lens group Gr3 includes a positive-meniscus third a-lens L3a convex to the object side, a negative-meniscus third b-lens L3b convex to the object side, a biconvex and positive third c-lens L3c, and a negative-meniscus third d-lens L3d convex to the object side. The fourth lens group Gr4 includes a biconvex and positive fourth lens L4a. The fifth lens group Gr5 includes a plano-concave and negative fifth lens L5a. Note that the first a-lens L1a and first b-lens L1b are cemented lenses and the third b-lens L3b and third c-lens L3c are cemented lenses. The second a-lens L2a, third a-lens L3a, third b-lens L3b, and fifth lens L5a are aspheric surface lenses. The filters F1 and F2 each having an appropriate thickness are arranged between the fifth lens L5a and the image pickup element 51. The filters F1 and F2 are parallel flat plates assuming an IR cut filter, an optical low-pass filter, a seal glass of a solid-state image pickup element, etc. Symbol I denotes an image pickup surface which is a surface to be projected of the image pickup element 51 (this is also true of the Examples hereinafter).

Figure 3A:
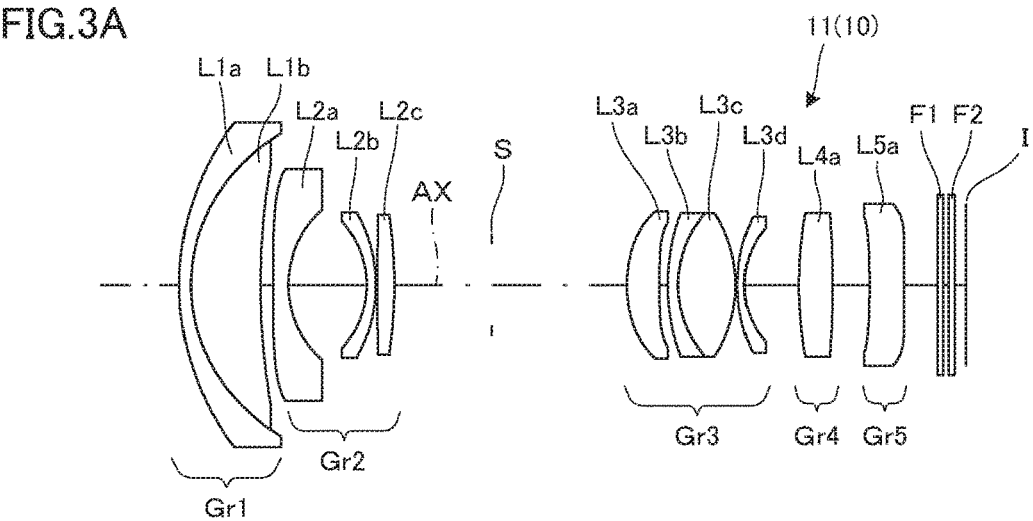
FIG. 3A is a cross-sectional view at a wide-angle end of Example 1.
Figure 3B:
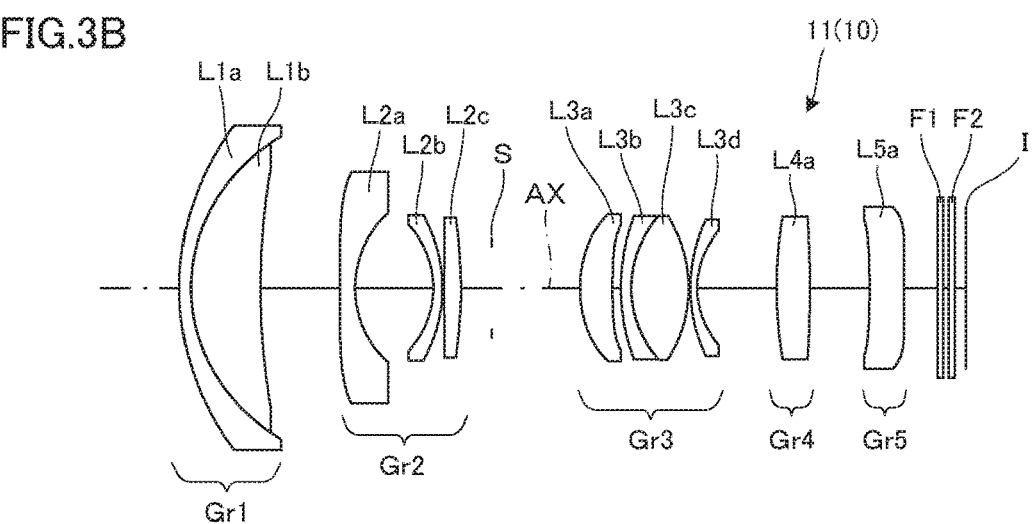
FIG. 3B is a cross-sectional view in the middle.
Figure 3C:
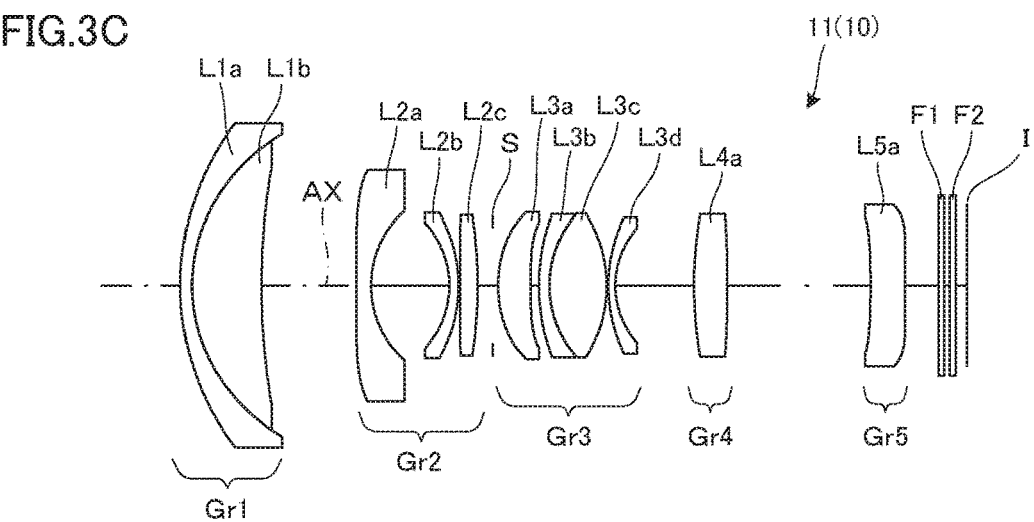
FIG. 3C is a cross-sectional view at a telephoto end.

FIGS. 3A to 3C illustrate the positions at the time of the zooming operation of the zoom lens 11 of Example 1, respectively. That is, FIG. 3A is a cross-sectional view at a wide-angle end of the zoom lens 11. FIG. 3B is a cross-sectional view in the middle. FIG. 3C is a cross-sectional view at a telephoto end. The second lens group Gr2 moves to the image side from a wide-angle end toward a telephoto end, while the third and fourth lens groups Gr3 and Gr4 move to the object side from a wide-angle end toward a telephoto end.

Figure 4A:
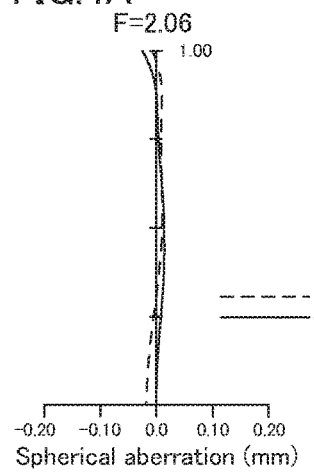
FIGS. 4A to 4C are the longitudinal aberration diagrams at a wide-angle end of the zoom lens of Example 1.
Figure 4B:
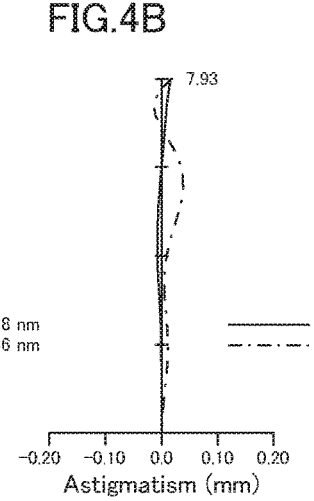
Figure 4C:
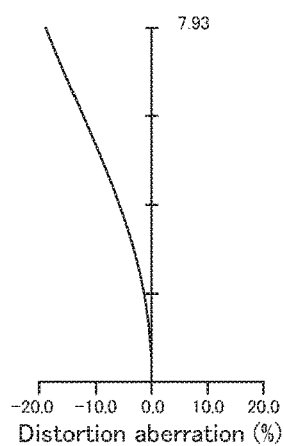
Figure 4D:
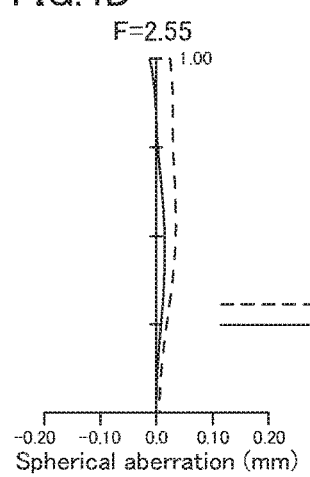
FIGS. 4D to 4F are the longitudinal aberration diagrams in the middle of the zoom lens of Example 1.
Figure 4E:
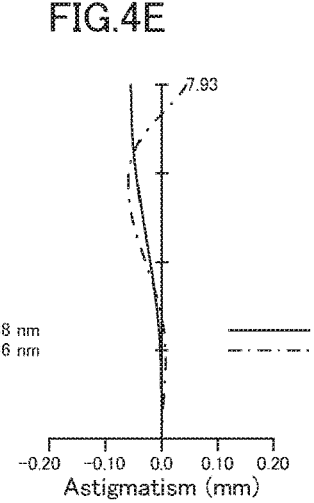
Figure 4F:
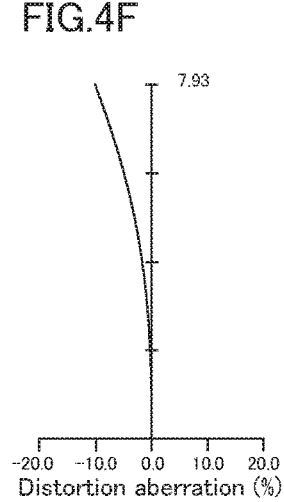
Figure 4G:
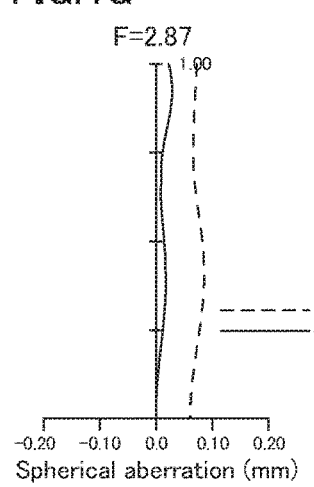
FIGS. 4G to 4I are the longitudinal aberration diagrams at a telephoto end of the zoom lens of Example 1.
Figure 4H:
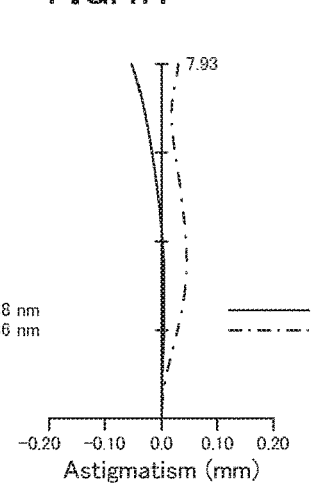
Figure 4I:
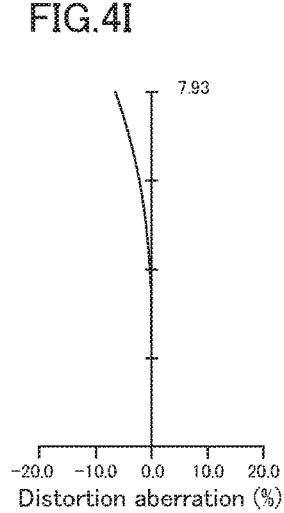

FIGS. 4A to 4C are the aberration diagrams (spherical aberration, astigmatism, and distortion aberration) during infinite-end focusing at a wide-angle end of the zoom lens 11. FIGS. 4D to 4F are the aberration diagrams (spherical aberration, astigmatism, and distortion aberration) during infinite-end focusing in the middle. FIGS. 4G to 4I are the aberration diagrams (spherical aberration, astigmatism, and distortion aberration) during infinite-end focusing at a telephoto end. Note that, in the above-described aberration diagrams and the aberration diagrams hereinafter, it is assumed that, in the astigmatism diagrams, a solid line indicates a sagittal image surface and a dashed-dotted line indicates a meridional image surface.

In the zoom lens 11 in Example 1, during magnification change from a wide-angle end to a telephoto end, the second lens group Gr2 moves to the image side along the optical axis AX direction while the third and fourth lens groups Gr3 and Gr4 move to the object side along the optical axis AX direction. The aperture stop S is fixed to the image surface or image pickup surface I at the time of magnification change.

Example 2

The data of a lens surface constituting a zoom lens of Example 2 is shown in Table 5 below.

TABLE 5

| S-N | R (mm) | D (mm) | Nd | νd | ER (mm) |
|---|---|---|---|---|---|
| 1 | 22.053 | 1.050 | 1.84666 | 23.7 | 11.20 |
| 2 | 14.445 | 0.010 | 1.51410 | 42.6 | 10.06 |
| 3 | 14.445 | 4.987 | 1.80420 | 46.5 | 10.06 |
| 4 | 87.677 | d1 | | | 9.30 |
| 5* | 55829.220 | 0.800 | 1.82080 | 42.7 | 6.72 |
| 6* | 6.393 | 4.066 | | | 4.69 |
| 7 | −7.000 | 0.600 | 1.69350 | 50.8 | 4.38 |
| 8 | −14.364 | 0.150 | | | 4.52 |
| 9 | 364.616 | 1.458 | 1.94595 | 18.0 | 4.47 |
| 10 | −26.775 | d2 | | | 4.44 |
| 11 S | infinity | d3 | | | 2.62 |
| 12* | 9.474 | 1.520 | 1.83441 | 37.2 | 3.71 |
| 13* | 98.311 | 0.548 | | | 3.55 |
| 14* | 15.935 | 0.700 | 1.82115 | 24.0 | 3.66 |
| 15 | 7.242 | 0.010 | 1.51410 | 42.6 | 3.60 |
| 16 | 7.242 | 3.223 | 1.49700 | 81.6 | 3.61 |
| 17 | −8.906 | 0.150 | | | 3.70 |
| 18 | 20.415 | 0.605 | 1.80610 | 33.2 | 3.70 |
| 19 | 6.871 | d4 | | | 3.35 |
| 20 | 20.378 | 1.974 | 1.49700 | 81.6 | 3.95 |
| 21 | −24.821 | d5 | | | 4.00 |
| 22* | −65.295 | 2.000 | 1.53048 | 55.7 | 4.21 |
| 23* | infinity | 0.978 | | | 4.40 |
| 24 | infinity | 0.500 | 1.51680 | 64.2 | 4.43 |
| 25 | infinity | 0.500 | | | 4.44 |
| 26 | infinity | 0.500 | 1.51680 | 64.2 | 4.46 |
| 27 | infinity | 1.000 | | | 4.47 |

The aspheric surface coefficients of the lens surfaces of Example 2 are shown in Table 6 below.

TABLE 6

Fifth Surface

K = 0.00000E+00, A4 = −0.23310E−03, A6 = 0.16311E−04,
A8 = −0.34818E−06, A10 = 0.41226E−08, A12 = −0.21398E−10
Sixth Surface K = −0.23969E+01, A4 = 0.58727E−03, A6 = 0.16811E−06,
A8 = 0.12950E−05, A10 = −0.54726E−07, A12 = 0.15063E−08
Twelfth Surface K = 0.14509E+00, A4 = 0.19895E−03, A6 = 0.22269E−04,
A8 = 0.96743E−06, A10 = −0.47256E−07, A12 = 0.10478E−08
Thirteenth Surface K = −0.28528E+00, A4 = 0.71103E−03, A6 = 0.59298E−04,
A8 = −0.18374E−06, A10 = 0.91071E−08, A12 = −0.67919E−09
Fourteenth Surface K = −0.16796E+01, A4 = −0.44957E−04, A6 = 0.38567E−04,
A8 = −0.21349E−05, A10 = 0.78269E−07, A12 = −0.19355E−08
Twenty-second Surface K = 0.00000E+00, A4 = 0.43694E−03, A6 = −0.31610E−04,
A8 = −0.22817E−07, A10 = 0.10276E−07, A12 = −0.41755E−09

TABLE 6-continued

Twenty-third Surface

K = 0.00000E+00, A4 = 0.86243E−03, A6 = −0.80660E−04,
A8 = 0.95397E−06, A10 = −0.15346E−07, A12 = 0.38165E−09

Among the positions: (wide-angle end; middle; and telephoto end), of the zoom lens of Example 2, the focal length (f) of the entire system, F number (Fno), half-angle of view (W), maximum image height (Y), and interval (dn and n=1 to 5) at each position are shown in Table 7 below.

TABLE 7

|     | Wide  | Middle | Tele  |
| --- | ----- | ------ | ----- |
| f   | 5.43  | 9.15   | 15.51 |
| Fno | 2.06  | 2.47   | 2.87  |
| W   | 41.0  | 27.3   | 16.9  |
| 2Y  | 7.630 | 8.656  | 8.993 |
| d1  | 0.807 | 4.719  | 7.179 |
| d2  | 7.072 | 3.160  | 0.700 |
| d3  | 8.510 | 5.872  | 2.324 |
| d4  | 2.405 | 3.852  | 4.161 |
| d5  | 3.11  | 4.296  | 7.535 |

The data of single-lens groups of Example 2 is shown in Table 8 below.

TABLE 8

| Lens Group | First Surface | Focal Length (mm) |
| --- | --- | --- |
| 1 | 1  | 36.44   |
| 2 | 5  | −7.51   |
| 3 | 12 | 12.27   |
| 4 | 20 | 22.85   |
| 5 | 22 | −123.09 |

Figure 5A:
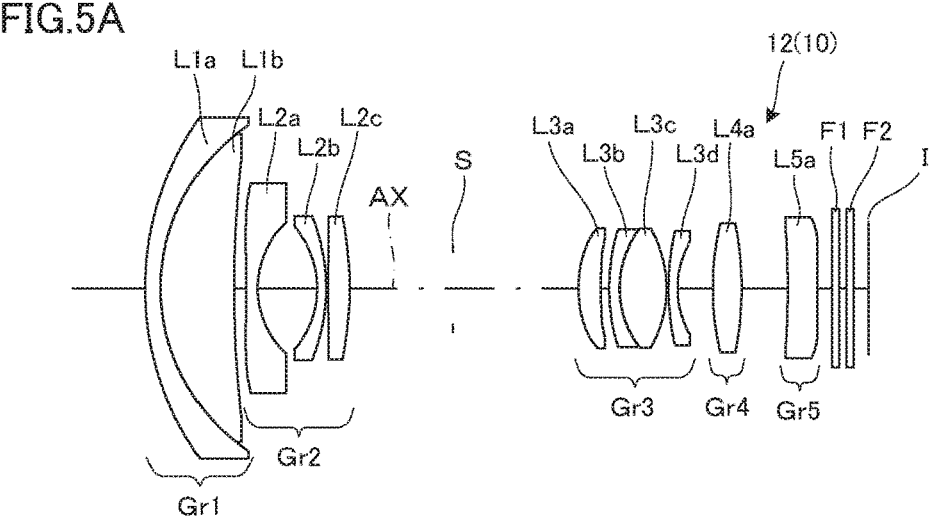
FIGS. 5A to 5C are cross-sectional views of a zoom lens and the like of Example 2, and illustrate the views at a wide-angle end, in the middle, and at a telephoto end, respectively.
Figure 5B:
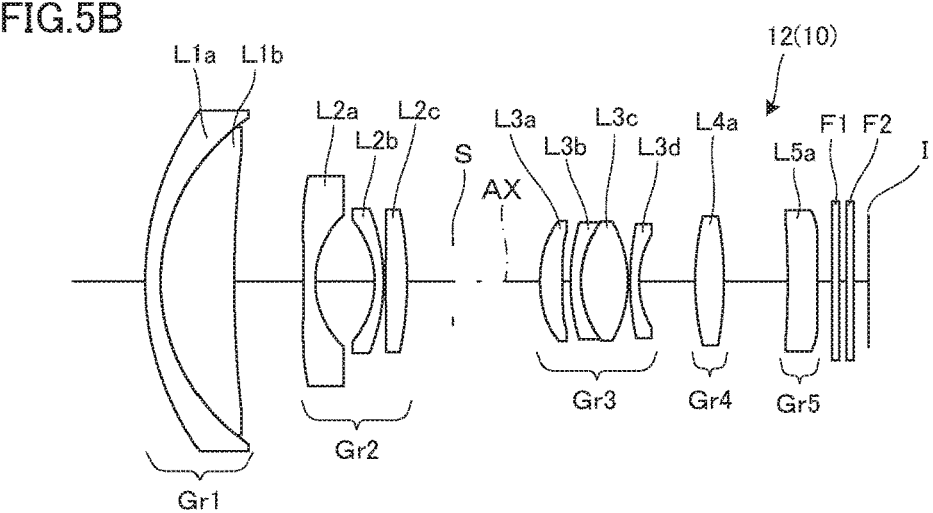
Figure 5C:
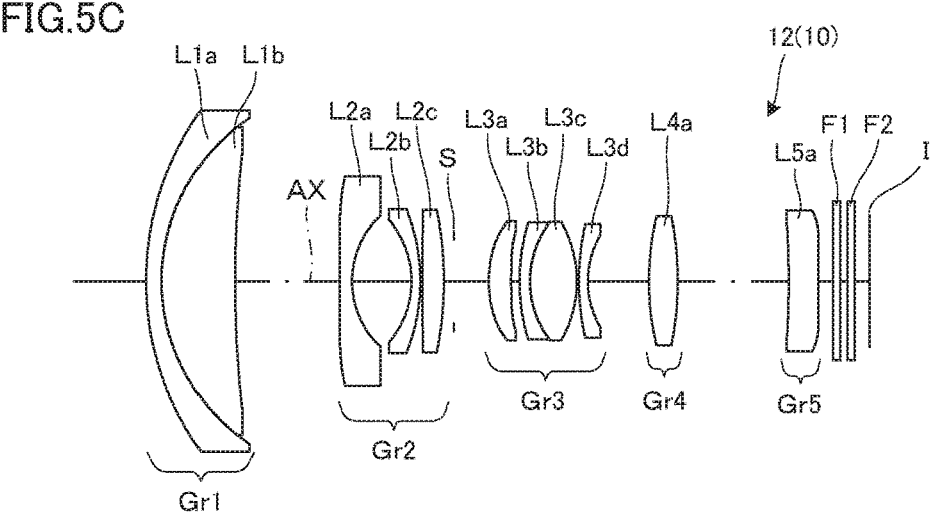

FIGS. 5A to 5C are cross-sectional views of a zoom lens 12 of Example 2 and illustrate the positions of the zoom lens 12 during the zoom operation, respectively. That is, FIG. 5A is a cross-sectional view at a wide-angle end of the zoom lens 12. FIG. 5B is a cross-sectional view in the middle. FIG. 5C is a cross-sectional view at a telephoto end.

The zoom lens 12 of Example 2 is composed of the first to fifth lens groups Gr1 to Gr5 in order from an object side, and has the configuration of positive, negative, positive, positive, and negative lenses. Here, the first lens group Gr1 includes a negative-meniscus first a-lens L1a convex to the object side and a positive-meniscus first b-lens L1b convex to the object side. The second lens group Gr2 includes a negative-meniscus second a-lens L2a convex to the object side, a negative-meniscus second b-lens L2b convex to the image side, and a biconvex and positive second c-lens L2c. The third lens group Gr3 includes a positive-meniscus third a-lens L3a convex to the object side, a negative-meniscus third b-lens L3b convex to the object side, a biconvex and positive third c-lens L3c, and a negative-meniscus third d-lens L3d convex to the object side. The fourth lens group Gr4 includes a biconvex and positive fourth lens L4a. The fifth lens group Gr5 includes a plano-concave and negative fifth lens L5a. Note that the first a-lens L1a and first b-lens L1b are cemented lenses and the third b-lens L3b and third c-lens L3c are cemented lenses. The second a-lens L2a, third a-lens L3a, third b-lens L3b, and fifth lens L5a are aspheric surface lenses. The filters F1 and F2 each having an appropriate thickness are arranged between the fifth lens L5a and the image pickup element 51.

Figure 6A:
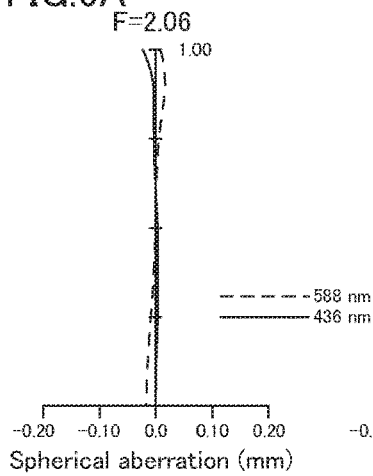
FIGS. 6A to 6C are the longitudinal aberration diagrams at a wide-angle end of the zoom lens of Example 2.
Figure 6B:
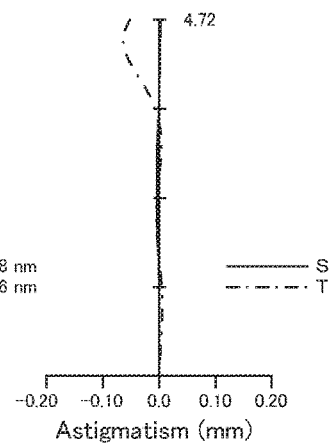
Figure 6C:
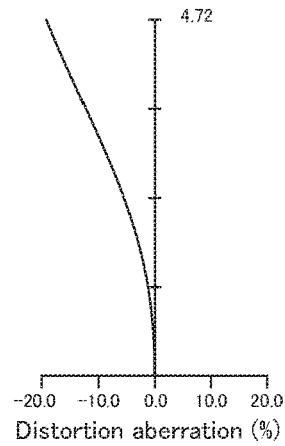
Figure 6D:
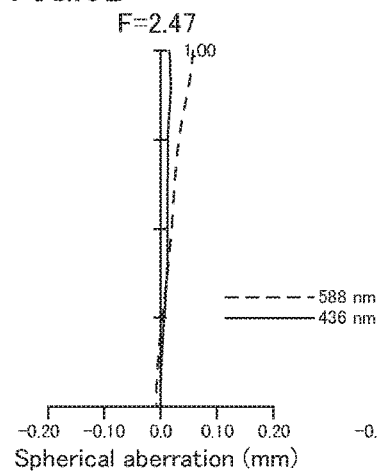
FIGS. 6D to 6F are the longitudinal aberration diagrams in the middle of the zoom lens of Example 2.
Figure 6E:
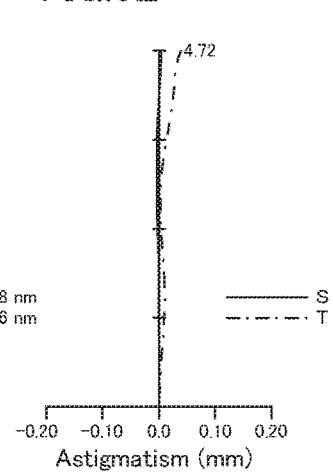
Figure 6F:
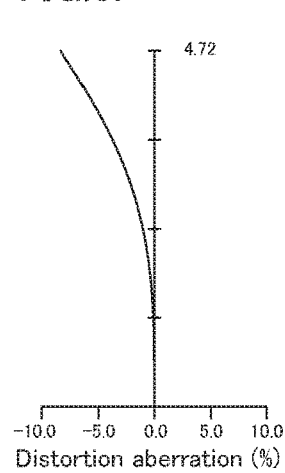
Figure 6G:
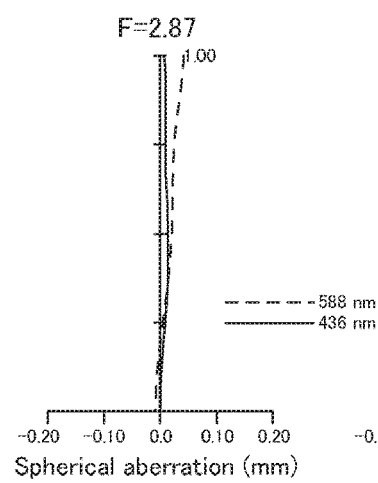
FIGS. 6G to 6I are the longitudinal aberration diagrams at a telephoto end of the zoom lens of Example 2.
Figure 6H:
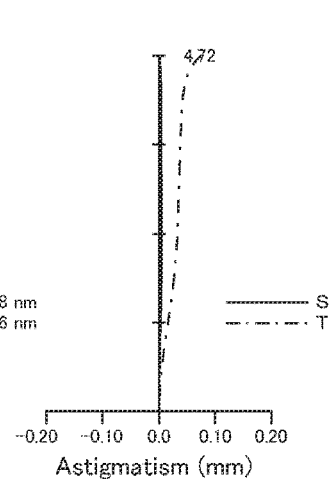
Figure 6I:
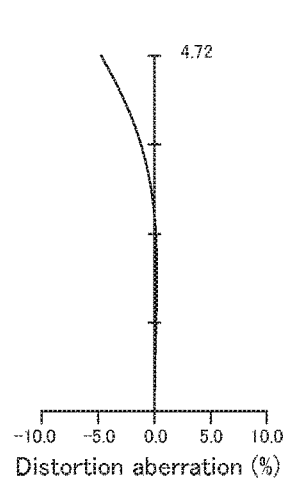

FIGS. 6A to 6C are the aberration diagrams (spherical aberration, astigmatism, and distortion aberration) during infinite-end focusing at a wide-angle end of the zoom lens 12. FIGS. 6D to 6F are the aberration diagrams (spherical aberration, astigmatism, and distortion aberration) during infinite-end focusing in the middle. FIGS. 6G to 6I are the aberration diagrams (spherical aberration, astigmatism, and distortion aberration) during infinite-end focusing at a telephoto end.

In the zoom lens 12 in Example 2, during magnification change from a wide-angle end to a telephoto end, the second lens group Gr2 moves to the image side along the optical axis AX direction while the third and fourth lens groups Gr3 and Gr4 move to the object side along the optical axis AX direction. The aperture stop S is fixed to the image surface or image pickup surface I at the time of magnification change.

Example 3

The data of a lens surface constituting a zoom lens of Example 3 is shown in Table 9 below.

TABLE 9

| S-N | R (mm) | D (mm) | Nd | vd | ER (mm) |
| --- | --- | --- | --- | --- | --- |
| 1   | 21.306   | 0.900 | 1.80518 | 25.4 | 11.50 |
| 2   | 16.259   | 0.010 | 1.51410 | 42.6 | 10.68 |
| 3   | 16.259   | 3.837 | 1.77250 | 49.6 | 10.68 |
| 4   | 38.476   | d1    |         |      | 10.14 |
| 5*  | 1000.017 | 0.833 | 1.77250 | 49.4 | 7.40  |
| 6*  | 6.619    | 5.170 |         |      | 5.31  |
| 7   | −7.102   | 0.600 | 1.64831 | 33.7 | 4.79  |
| 8   | −12.061  | 0.100 |         |      | 4.98  |
| 9   | 2053.875 | 1.521 | 1.94595 | 18.0 | 4.91  |
| 10  | −28.676  | d2    |         |      | 4.86  |
| 11 S | infinity | d3   |         |      | 3.25  |
| 12* | 12.322   | 1.689 | 1.80139 | 45.4 | 4.21  |
| 13* | 103.848  | 0.468 |         |      | 4.03  |
| 14* | 13.752   | 0.800 | 1.68893 | 31.1 | 4.21  |
| 15  | 7.575    | 0.010 | 1.51410 | 42.6 | 4.13  |
| 16  | 7.575    | 3.766 | 1.49700 | 81.6 | 4.13  |
| 17  | −9.762   | 0.150 |         |      | 4.15  |
| 18  | 17.657   | 0.600 | 1.75520 | 27.5 | 3.80  |
| 19  | 6.634    | d4    |         |      | 3.58  |
| 20  | 23.696   | 1.440 | 1.49700 | 81.6 | 3.98  |
| 21  | −40.005  | d5    |         |      | 4.00  |
| 22* | 117.891  | 2.000 | 1.53048 | 55.7 | 4.39  |
| 23* | infinity | 1.500 |         |      | 4.60  |
| 24  | infinity | 0.500 | 1.51680 | 64.2 | 4.53  |
| 25  | infinity | 0.500 |         |      | 4.52  |
| 26  | infinity | 0.500 | 1.51680 | 64.2 | 4.50  |
| 27  | infinity | 1.000 |         |      | 4.49  |

The aspheric surface coefficients of the lens surfaces of Example 3 are shown in Table 10 below.

TABLE 10

Fifth Surface

K = 0.00000E+00, A4 = −0.17935E−03, A6 = 0.12316E−04,
A8 = −0.26493E−06, A10 = 0.29737E−08, A12 = −0.12695E−10

Sixth Surface

K = −0.22327E+01, A4 = 0.39646E−03, A6 = 0.20318E−05,
A8 = 0.51209E−06, A10 = −0.19299E−07, A12 = 0.31064E−09

Twelfth Surface

K = 0.91230E−01, A4 = 0.41195E−04, A6 = 0.15309E−04,
A8 = 0.45009E−06, A10 = −0.35413E−07, A12 = 0.27102E−09

TABLE 10-continued

Thirteenth Surface

K = −0.18792E+03, A4 = 0.44804E−03, A6 = 0.50434E−04,
A8 = −0.67498E−06, A10 = −0.15747E−07, A12 = −0.16892E−09

Fourteenth Surface

K = −0.23777E+01, A4 = 0.98001E−04, A6 = 0.41911E−04,
A8 = −0.20121E−05, A10 = 0.42749E−07, A12 = −0.40585E−09

Twenty-second Surface

K = 0.00000E+00, A4 = 0.20959E−03, A6 = −0.37518E−04,
A8 = −0.13079E−06, A10 = 0.55583E−07, A12 = −0.20007E−08

Twenty-third Surface

K = 0.00000E+00, A4 = 0.52769E−03, A6 = −0.80842E−04,
A8 = 0.13756E−05, A10 = −0.19456E−08, A12 = −0.45391E−09

Among the positions: (wide-angle end; middle; and telephoto end), of the zoom lens of Example 3, the focal length (f) of the entire system, F number (Fno), half-angle of view (W), maximum image height (Y), and interval (dn and n=1 to 5) at each position are shown in Table 11 below.

TABLE 11

|    | Wide   | Middle | Tele   |
|----|--------|--------|--------|
| f  | 5.24   | 9.00   | 14.97  |
| Fno| 1.87   | 2.18   | 2.88   |
| W  | 42.0   | 27.7   | 17.5   |
| 2Y | 7.660  | 8.497  | 8.898  |
| d1 | 1.290  | 7.506  | 9.574  |
| d2 | 10.284 | 4.068  | 2.000  |
| d3 | 7.718  | 5.230  | 0.500  |
| d4 | 2.834  | 3.465  | 4.677  |
| d5 | 3.22   | 5.074  | 8.592  |

The data of single-lens groups of Example 3 is shown in Table 12 below.

TABLE 12

| Lens Group | First Surface | Focal Length (mm) |
|---|---|---|
| 1 | 1  | 56.57  |
| 2 | 5  | −9.16  |
| 3 | 12 | 13.31  |
| 4 | 20 | 30.17  |
| 5 | 22 | 222.23 |

Figure 7A:
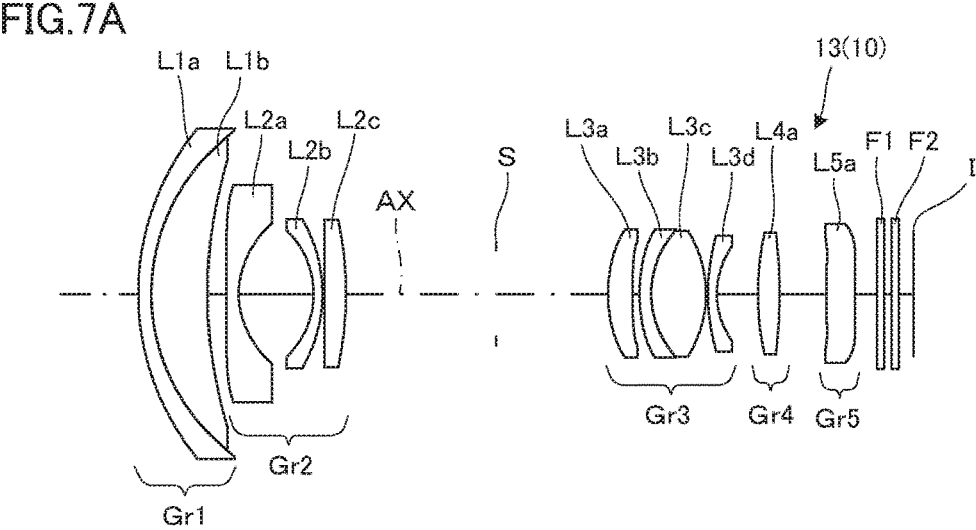
FIGS. 7A to 7C are the cross-sectional views of a zoom lens and the like of Example 3, and illustrate the views at a wide-angle end, in the middle, and at a telephoto end, respectively.
Figure 7B:
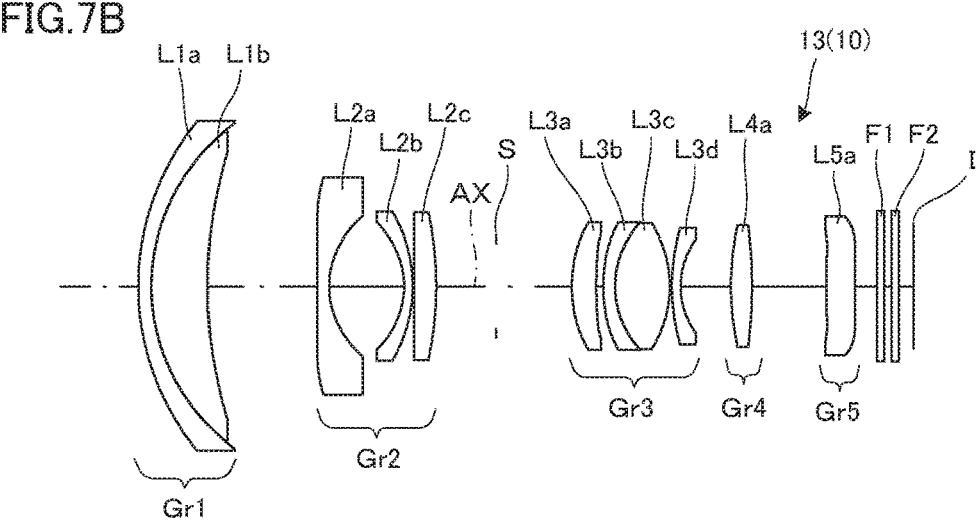
Figure 7C:
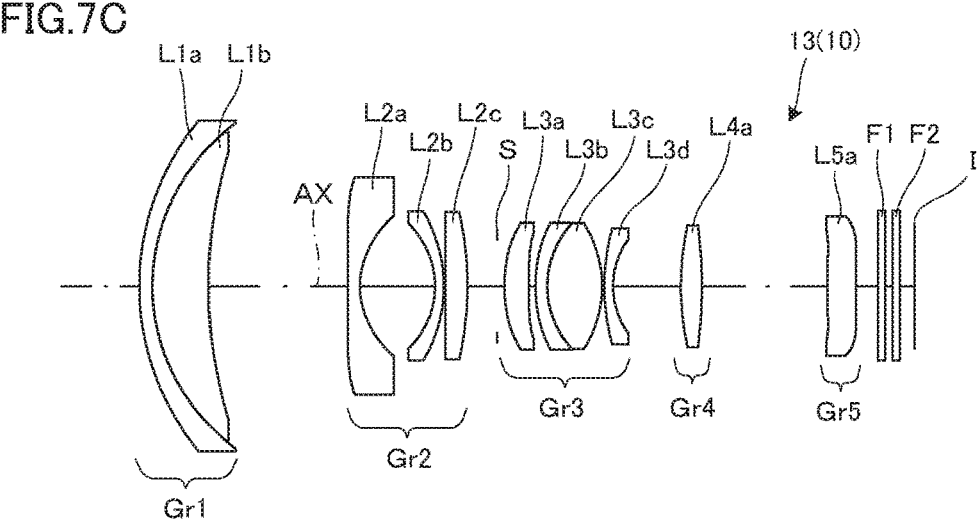

FIGS. 7A to 7C are cross-sectional views of a zoom lens 13 of Example 3 and illustrate the positions of the zoom lens 13 during the zoom operation, respectively. That is, FIG. 7A is a cross-sectional view at a wide-angle end of the zoom lens 13. FIG. 7B is a cross-sectional view in the middle. FIG. 7C is a cross-sectional view at a telephoto end.

The zoom lens 13 of Example 3 is composed of the first to fifth lens groups Gr1 to Gr5 in order from an object side, and has the configuration of positive, negative, positive, positive, and negative lenses. Here, the first lens group Gr1 includes a negative-meniscus first a-lens L1a convex to the object side and a positive-meniscus first b-lens L1b convex to the object side. The second lens group Gr2 includes a negative-meniscus second a-lens L2a convex to the object side, a negative-meniscus second b-lens L2b convex to the image side, and a biconvex and positive second c-lens L2c. The third lens group Gr3 includes a positive-meniscus third a-lens L3a convex to the object side, a negative-meniscus third b-lens L3b convex to the object side, a biconvex and positive third c-lens L3c, and a negative-meniscus third d-lens L3d convex to the object side. The fourth lens group Gr4 includes a biconvex and positive fourth lens L4a. The fifth lens group Gr5 includes the plano-convex and positive fifth lens L5a. Note that the first a-lens L1a and first b-lens L1b are cemented lenses and the third b-lens L3b and third c-lens L3c are cemented lenses. The second a-lens L2a, third a-lens L3a, third b-lens L3b, and fifth lens L5a are aspheric surface lenses. The filters F1 and F2 each having an appropriate thickness are arranged between the fifth lens L5a and the image pickup element 51.

FIGS. 8A to 8C are the aberration diagrams (spherical aberration, astigmatism, and distortion aberration) during infinite-end focusing at a wide-angle end of the zoom lens 13. FIGS. 8D to 8F are the aberration diagrams (spherical aberration, astigmatism, and distortion aberration) during infinite-end focusing in the middle. FIGS. 8G to 8I are the aberration diagrams (spherical aberration, astigmatism, and distortion aberration) during infinite-end focusing at a telephoto end.

In the zoom lens 13 in Example 3, during magnification change from a wide-angle end to a telephoto end, the second lens group Gr2 moves to the image side along the optical axis AX direction while the third and fourth lens groups Gr3 and Gr4 move to the object side along the optical axis AX direction. The aperture stop S is fixed to the image surface or image pickup surface I at the time of magnification change.

Example 4

The data of a lens surface constituting a zoom lens of Example 4 is shown in Table 13 below.

TABLE 13

| S-N | R (mm)   | D (mm) | Nd      | vd   | ER (mm) |
|-----|----------|--------|---------|------|---------|
| 1   | 18.837   | 1.260  | 1.80518 | 25.4 | 12.00   |
| 2   | 14.674   | 0.010  | 1.51410 | 42.6 | 10.56   |
| 3   | 14.674   | 4.190  | 1.73400 | 51.4 | 10.56   |
| 4   | 34.230   | d1     |         |      | 10.30   |
| 5*  | 872.881  | 1.286  | 1.80139 | 45.4 | 7.52    |
| 6*  | 6.570    | 5.316  |         |      | 5.27    |
| 7   | −7.434   | 0.650  | 1.83481 | 42.7 | 4.59    |
| 8   | −11.422  | 0.150  |         |      | 4.77    |
| 9   | 3710.155 | 1.569  | 1.94595 | 18.0 | 4.66    |
| 10  | −30.926  | d2     |         |      | 4.60    |
| 11 S| infinity | d3     |         |      | 3.27    |
| 12* | 13.561   | 1.666  | 1.80139 | 45.4 | 4.37    |
| 13* | 3803.986 | 0.200  |         |      | 4.25    |
| 14* | 15.490   | 0.879  | 1.75501 | 51.1 | 4.40    |
| 15  | 8.721    | 0.010  | 1.51410 | 42.6 | 4.32    |
| 16  | 8.721    | 3.887  | 1.49700 | 81.6 | 4.32    |
| 17  | −11.244  | 0.150  |         |      | 4.32    |
| 18  | 59.415   | 1.115  | 1.78472 | 25.6 | 4.20    |
| 19  | 8.418    | d4     |         |      | 3.93    |
| 20  | 36.903   | 1.597  | 1.49700 | 81.6 | 4.35    |
| 21  | −16.843  | d5     |         |      | 4.40    |
| 22  | 26.652   | 2.234  | 1.49700 | 81.6 | 4.60    |
| 23  | −32.621  | 1.425  |         |      | 4.55    |
| 24* | −17.057  | 2.267  | 1.53048 | 55.7 | 4.40    |
| 25* | −103.310 | 0.500  |         |      | 4.50    |
| 26  | infinity | 0.500  | 1.51680 | 64.2 | 4.50    |
| 27  | infinity | 1.329  |         |      | 4.50    |
| 28  | infinity | 0.500  | 1.51680 | 64.2 | 4.50    |
| 29  | infinity | 1.000  |         |      | 4.49    |

The aspheric surface coefficients of the lens surfaces of Example 4 are shown in Table 14 below.

TABLE 14

Fifth Surface

K = 0.00000E+00, A4 = −0.15236E−03, A6 = 0.10346E−04,
A8 = −0.22107E−06, A10 = 0.23641E−08, A12 = −0.98379E−11

TABLE 14-continued

Sixth Surface

K = −0.21864E+01, A4 = 0.41224E−03, A6 = 0.24314E−06,
A8 = 0.63054E−06, A10 = −0.22307E−07, A12 = 0.26591E−09

Twelfth Surface

K = 0.52170E−01, A4 = −0.27592E−05, A6 = 0.12876E−04,
A8 = 0.41680E−06, A10 = −0.25439E−07, A12 = 0.24263E−09

Thirteenth Surface

K = 0.00000E+00, A4 = 0.32293E−03, A6 = 0.47513E−04,
A8 = −0.78634E−06, A10 = −0.11284E−07, A12 = 0.16793E−09

Fourteenth Surface

K = −0.21361E+01, A4 = 0.92149E−04, A6 = 0.42345E−04,
A8 = −0.20336E−05, A10 = 0.39889E−07, A12 = −0.30220E−09

Twenty-fourth Surface

K = 0.00000E+00, A4 = 0.27018E−03, A6 = −0.97607E−05,
A8 = −0.60445E−07, A10 = 0.12107E−07, A12 = −0.27572E−09

Twenty-fifth Surface

K = 0.00000E+00, A4 = 0.43505E−03, A6 = −0.34311E−04,
A8 = 0.59244E−06, A10 = −0.24476E−08, A12 = −0.64554E−10

Among the positions: (wide-angle end; middle; and telephoto end), of the zoom lens of Example 4, the focal length (f) of the entire system, F number (Fno), half-angle of view (W), maximum image height (Y), and interval (dn and n=1 to 5) at each position are shown in Table 15 below.

TABLE 15

|    | Wide  | Middle | Tele  |
|----|-------|--------|-------|
| f  | 5.36  | 9.34   | 15.33 |
| Fno| 1.88  | 2.20   | 2.87  |
| W  | 41.4  | 26.8   | 17.1  |
| 2Y | 7.671 | 8.511  | 8.977 |
| d1 | 1.440 | 7.342  | 8.653 |
| d2 | 9.943 | 4.041  | 2.730 |
| d3 | 8.598 | 5.838  | 0.500 |
| d4 | 2.901 | 2.754  | 2.913 |
| d5 | 1.48  | 4.383  | 9.563 |

The data of single-lens groups of Example 4 is shown in Table 16 below.

TABLE 16

| Lens Group | First Surface | Focal Length (mm) |
|------------|---------------|-------------------|
| 1          | 1             | 52.07             |
| 2          | 5             | −8.45             |
| 3          | 12            | 16.08             |
| 4          | 20            | 23.50             |
| 5          | 22            | 106.19            |

Figure 9A:
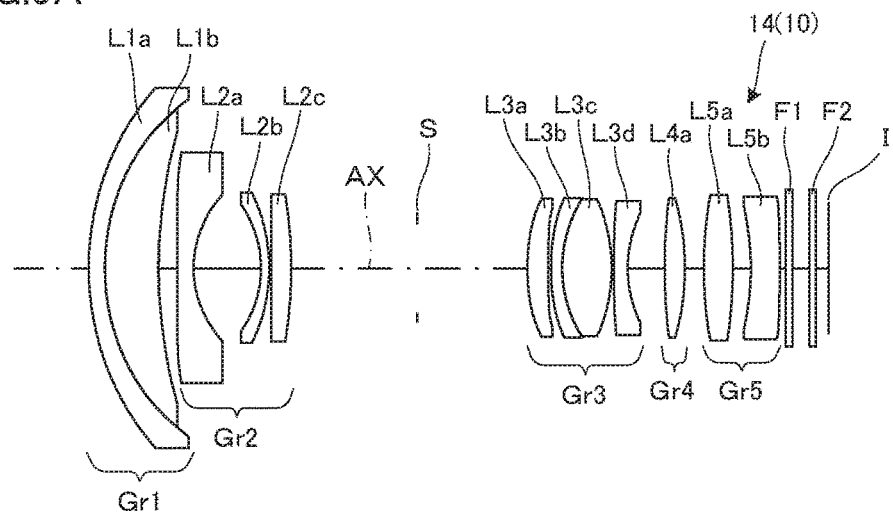
FIGS. 9A to 9C are the cross-sectional views of a zoom lens and the like of Example 4, and illustrate the views at a wide-angle end, in the middle, and at a telephoto end, respectively.
Figure 9B:
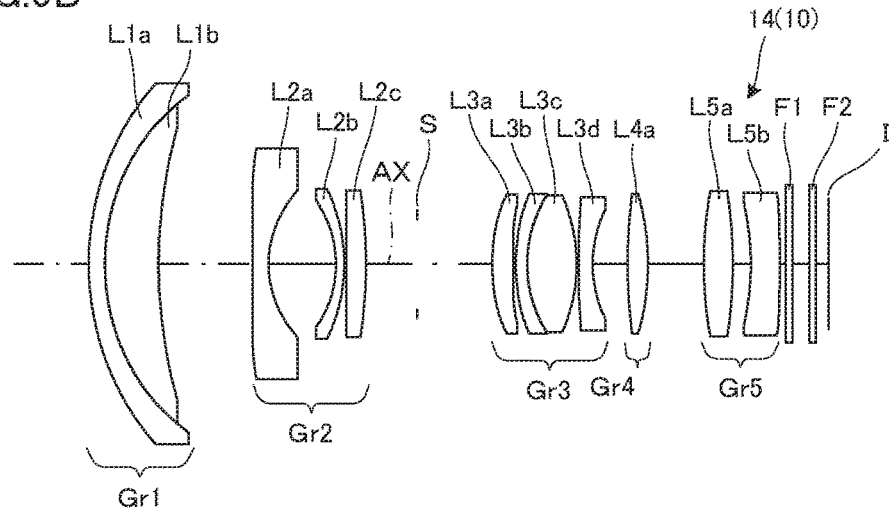
Figure 9C:
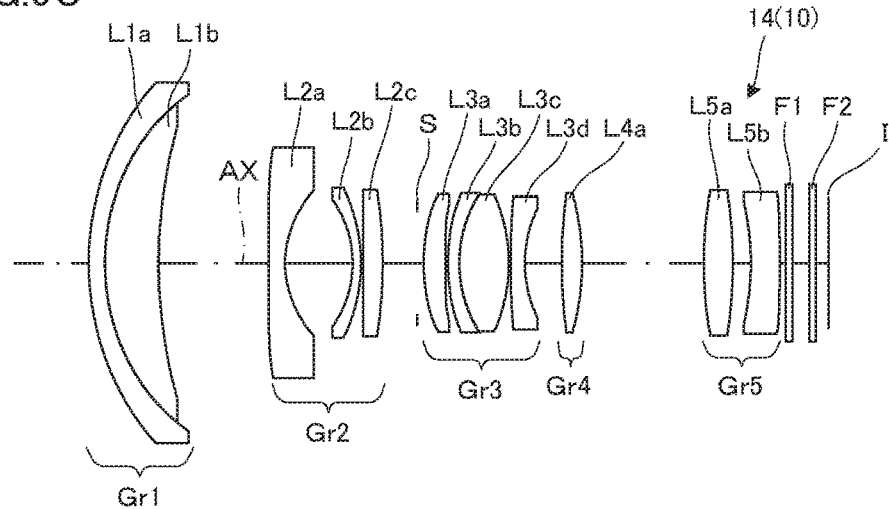

FIGS. 9A to 9C are cross-sectional views of a zoom lens 14 of Example 4 and illustrate the positions of the zoom lens 14 during the zoom operation, respectively. That is, FIG. 9A is a cross-sectional view at a wide-angle end of the zoom lens 14. FIG. 9B is a cross-sectional view in the middle. FIG. 9C is a cross-sectional view at a telephoto end.

The zoom lens 14 of Example 4 is composed of the first to fifth lens groups Gr1 to Gr5 in order from an object side, and has the configuration of positive, negative, positive, positive, and negative lenses. Here, the first lens group Gr1 includes a negative-meniscus first a-lens L1a convex to the object side and a positive-meniscus first b-lens L1b convex to the object side. The second lens group Gr2 includes a negative-meniscus second a-lens L2a convex to the object side, a negative-meniscus second b-lens L2b convex to the image side, and a biconvex and positive second c-lens L2c. The third lens group Gr3 includes a positive-meniscus third a-lens L3a convex to the object side, a negative-meniscus third b-lens L3b convex to the object side, a biconvex and positive third c-lens L3c, and a negative-meniscus third d-lens L3d convex to the object side. The fourth lens group Gr4 includes a biconvex and positive fourth lens L4a. The fifth lens group Gr5 includes the biconvex and positive fifth a-lens L5a and the negative-meniscus fifth b-lens L5b convex to the image side. Note that the first a-lens L1a and first b-lens L1b are cemented lenses and the third b-lens L3b and third c-lens L3c are cemented lenses. The second a-lens L2a, third a-lens L3a, third b-lens L3b, and fifth b-lens L5b are aspheric surface lenses. The filters F1 and F2 each having an appropriate thickness are arranged between the b fifth lens L5b and the image pickup element 51. The fifth a-lens L5a among the fifth lens group Gr5 is for camera shake correction.

Figure 10A:
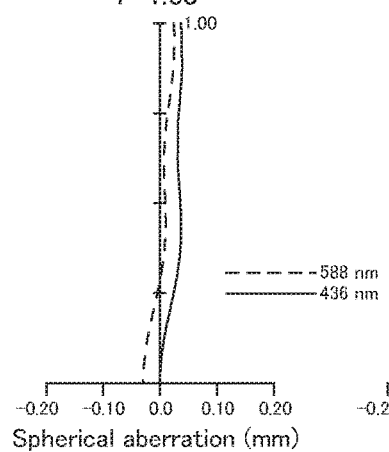
FIGS. 10A to 10C are the longitudinal aberration diagrams at a wide-angle end of the zoom lens of Example 4.
Figure 10B:
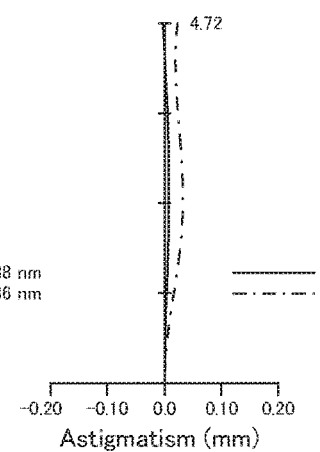
Figure 10C:
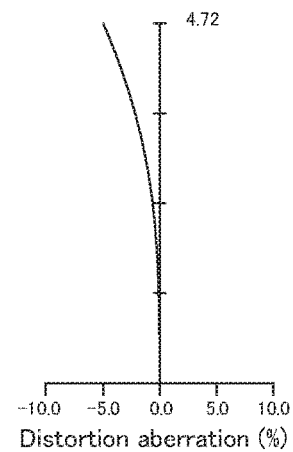
Figure 10D:
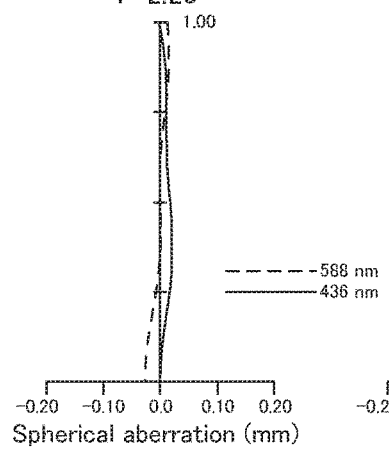
FIGS. 10D to 10F are the longitudinal aberration diagrams in the middle of the zoom lens of Example 4.
Figure 10E:
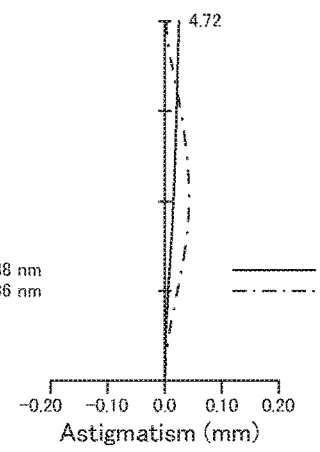
Figure 10F:
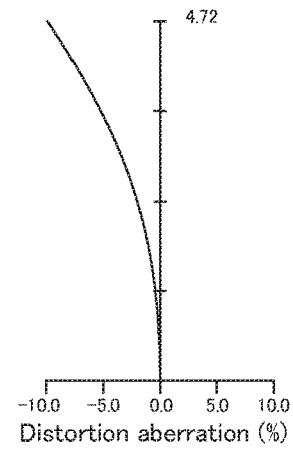
Figure 10G:
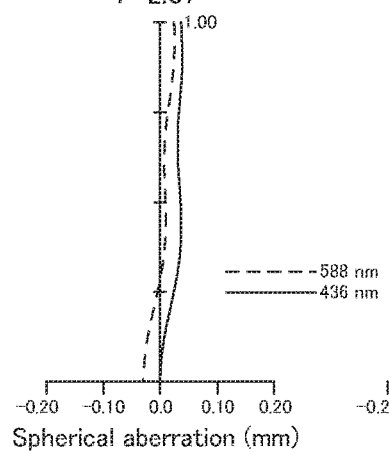
FIGS. 10G to 10I are the longitudinal aberration diagrams at a telephoto end of the zoom lens of Example 4.
Figure 10H:
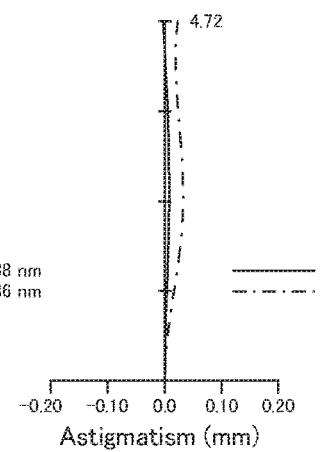
Figure 10I:
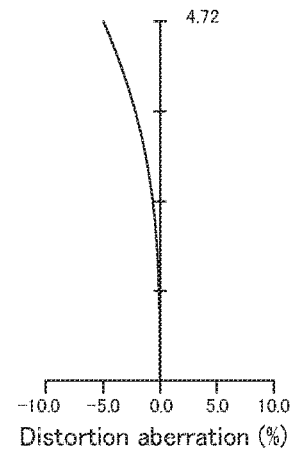

FIGS. 10A to 10C are the aberration diagrams (spherical aberration, astigmatism, and distortion aberration) during infinite-end focusing at a wide-angle end of the zoom lens 14. FIGS. 10D to 10F are the aberration diagrams (spherical aberration, astigmatism, and distortion aberration) during infinite-end focusing in the middle. FIGS. 10G to 10I are the aberration diagrams (spherical aberration, astigmatism, and distortion aberration) during infinite-end focusing at a telephoto end.

In the zoom lens 14 in Example 4, during magnification change from a wide-angle end to a telephoto end, the second lens group Gr2 moves to the image side along the optical axis AX direction while the third and fourth lens groups Gr3 and Gr4 move to the object side along the optical axis AX direction. The aperture stop S is fixed to the image surface or image pickup surface I at the time of magnification change.

Table 17 below summarizes the values of each of Examples 1 to 4 corresponding to each of the conditional expressions (1) to (6), for reference.

TABLE 17

| | Conditional Expression | | | | | |
|---|---|---|---|---|---|---|
| | (1) f1/fw | (2) f3/fw | (3) f2/fw | (4) \|β2T/β2W\| \|β3T/β3W\| | (5) f4/fw | (6) (1 − βs) × βp |
| Example 1 | 7.53  | 1.81 | −1.35 | 0.41 | 7.37 | — |
| Example 2 | 6.71  | 2.26 | −1.38 | 0.46 | 4.21 | — |
| Example 3 | 10.81 | 2.54 | −1.75 | 0.41 | 5.76 | — |
| Example 4 | 9.71  | 3.00 | −1.58 | 0.20 | 4.38 | 0.25 |

In the foregoing, the zoom lenses according to the embodiments have been explained, but the image pickup lens according to the present invention is not limited to the above-described embodiments. For example, the zoom lens 10 may further include a lens group substantially not having a power. Moreover, each of the lens groups Gr1 to Gr5 constituting the zoom lens 10 may further include the other optical element (e.g., lens) substantially not having a power.

Moreover, in the above-described Examples, the material of each lens is just an example and is not limited thereto, and can be changed as needed.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A zoom lens comprising: a first lens group having a positive refractive power; a second lens group having a negative refractive power; a third lens group having a positive refractive power; a fourth lens group having a positive refractive power; and a fifth lens group arranged in order from an object side, wherein
at a time of magnification change from a wide-angle end to a telephoto end, the first lens group and fifth lens group are fixed, while the second lens group, the third lens group, and the fourth lens group move, and the following conditional expressions are satisfied:

$$6.0 < f1/fw < 11.0 \quad (1)$$

$$1.80 < f3/fw < 3.10 \quad (2)$$

where
f1: focal length (mm) of the first lens group
f3: focal length (mm) of the third lens group
fw: focal length (mm) of an entire system at a wide-angle end.

2. The zoom lens according to claim 1, wherein the third lens group includes a third a-lens having a positive refractive power, a third b-lens having a negative refractive power, a third c-lens having a positive refractive power, and a third d-lens having a negative refractive power in order from an object side.

3. The zoom lens according to claim 2, wherein the third b-lens and the third c-lens are cemented lenses.

4. The zoom lens according to claim 2, wherein the third a-lens has a convex surface facing an object side, and
the third lens group has at least one aspheric surface.

5. The zoom lens according to claim 1, wherein the first lens group includes a first a-lens having a negative refractive power and a first b-lens having a positive refractive power in order from an object side.

6. The zoom lens according to claim 5, wherein the first a-lens and the first b-lens are cemented lenses.

7. The zoom lens according to claim 1, wherein the second lens group has a second a-lens having a negative refractive power, a second b-lens having a negative refractive power, and a second c-lens having a positive refractive power in order from an object side.

8. The zoom lens according to claim 1, wherein the second lens group has at least one aspheric surface.

9. The zoom lens according to claim 1, wherein the following conditional expression is satisfied:

$$-2.00 < f2/fw < -1.30 \quad (3)$$

where
f2: focal length (mm) of the second lens group
fw: focal length (mm) of an entire system at a wide-angle end.

10. The zoom lens according to claim 1, wherein the following conditional expression is satisfied:

$$0.10 < |\beta 2T/\beta 2W|/|\beta 3T/\beta 3W| < 0.80 \quad (4)$$

where
β2W: lateral magnification at a wide-angle end of the second lens group
β2T: lateral magnification at a telephoto end of the second lens group
β3W: lateral magnification at a wide-angle end of the third lens group
β3T: lateral magnification at a telephoto end of the third lens group.

11. The zoom lens according to claim 1, wherein the fourth lens group includes a single lens having a positive refractive power.

12. The zoom lens according to claim 1, wherein the following conditional expression is satisfied:

$$3.00 < f4/fw < 8.00 \quad (5)$$

where
f4: focal length (mm) of the fourth lens group
fw: focal length (mm) of an entire system at a wide-angle end.

13. The zoom lens according to claim 1, wherein an aperture stop is arranged on an object side of the third lens group, and
the aperture stop is fixed with respect to an image surface position at a time of magnification change from a wide-angle end to a telephoto end.

14. The zoom lens according to claim 1, wherein the fifth lens group includes a fifth a-lens having a positive refractive power and a fifth b-lens having a negative refractive power in order from an object side, and
the fifth a-lens is capable of correcting or suppressing an image blur by being shifted in a direction perpendicular to an optical axis, and the following conditional expression is satisfied:

$$0.1 < (1-\beta s) \times \beta p < 0.5 \quad (6)$$

where
βs: lateral magnification of the fifth a-lens at a telephoto end of the fifth lens group
βp: lateral magnification of the fifth b-lens at a telephoto end of the fifth lens group.

15. The zoom lens according to claim 1, wherein the fifth lens group includes a single lens having at least one aspheric surface.

16. The zoom lens according to claim 1, wherein the zoom lens performs focusing from an infinite object to a short-distance object by moving the fourth lens group in an optical axis direction.

17. An image pickup device having the zoom lens according to claim 1 mounted thereon.

* * * * *